United States Patent [19]
Britton et al.

[11] Patent Number: 5,425,028
[45] Date of Patent: Jun. 13, 1995

[54] PROTOCOL SELECTION AND ADDRESS RESOLUTION FOR PROGRAMS RUNNING IN HETEROGENEOUS NETWORKS

[75] Inventors: Kathryn H. Britton, Chapel Hill, N.C.; Tein-Yaw D. Chung, Taoyuan, Taiwan, Prov. of China; Willibald A. Doeringer, Langnau; Douglas H. Dykeman, Reuschlikon, both of Switzerland; Allan K. Edwards, Raleigh, N.C.; Johny Mathew; Diane P. Pozefsky, both of Chapel Hill, N.C.; Soumitra Sarkar, Durham; N.C.; Roger D. Turner, Cary, both of N.C.

[73] Assignee: International Business Machines Corporation, Armonk, N.Y.

[21] Appl. No.: 915,969

[22] Filed: Jul. 16, 1992

[51] Int. Cl.⁶ .................. H04Q 11/04; G06F 13/00
[52] U.S. Cl. .................. 370/94.1; 370/110.1; 395/200; 395/325; 395/800
[58] Field of Search .............. 370/24, 32, 60, 85.1, 370/85.2, 85.4, 85.6, 85.13, 94.1, 94.3, 110.1; 340/825.5, 825.51; 395/200, 325, 725, 775, 800

[56] References Cited

U.S. PATENT DOCUMENTS

| | | | |
|---|---|---|---|
| 4,653,047 | 3/1987 | Vij et al. | 370/85.13 |
| 4,677,611 | 6/1987 | Yanossy, Jr. et al. | 370/85.13 |
| 4,736,369 | 4/1988 | Barzilai et al. | 370/94.1 |
| 4,885,739 | 12/1989 | Read et al. | 370/58.1 |
| 4,914,571 | 4/1990 | Baratz et al. | 364/200 |
| 5,012,470 | 4/1991 | Shobu et al. | 370/94.1 |
| 5,109,483 | 4/1992 | Baratz et al. | 395/200 |
| 5,187,708 | 2/1993 | Nakatani et al. | 370/94.1 |
| 5,224,098 | 6/1993 | Bird et al. | 370/94.1 |

Primary Examiner—Alpus Hsu
Attorney, Agent, or Firm—Stephen T. Keohane

[57] ABSTRACT

The present invention is a general solution to the problem address incompatibility between application programs and transport services. The invention may be embodied in a method for mapping the application program address (program address) to the transport services address (transport Provider address). According to the method, a program address is registered in the network so that it becomes available to other programs that understand the address, even if they are running over a transport protocol that does not understand the address format. When a request is made that a connection be established between a program and a program partner or that a datagram be sent therebetween, the program address is mapped to the transport Provider address (if necessary). The program address is then conveyed to the program partner so that it knows who it is talking to.

18 Claims, 30 Drawing Sheets

FIG. 4

ADDRESS REGISTRY

| USER | PROVIDER 1 ID | PROVIDER 2 ID | PROVIDER N ID |
|---|---|---|---|
| TYPE, USER_1 | PROV_1 | PROV_2 | UNSUPPORTED PROTOCOL |
| TYPE, USER_2 | UNSUPPORTED PROTOCOL | PROV_2 | PROV_N |
| TYPE, USER_3 | PROV_1 | UNSUPPORTED PROTOCOL | PROV_N |
| TYPE, USER_Z | PROV_1 | PROV_2 | PROV_N |

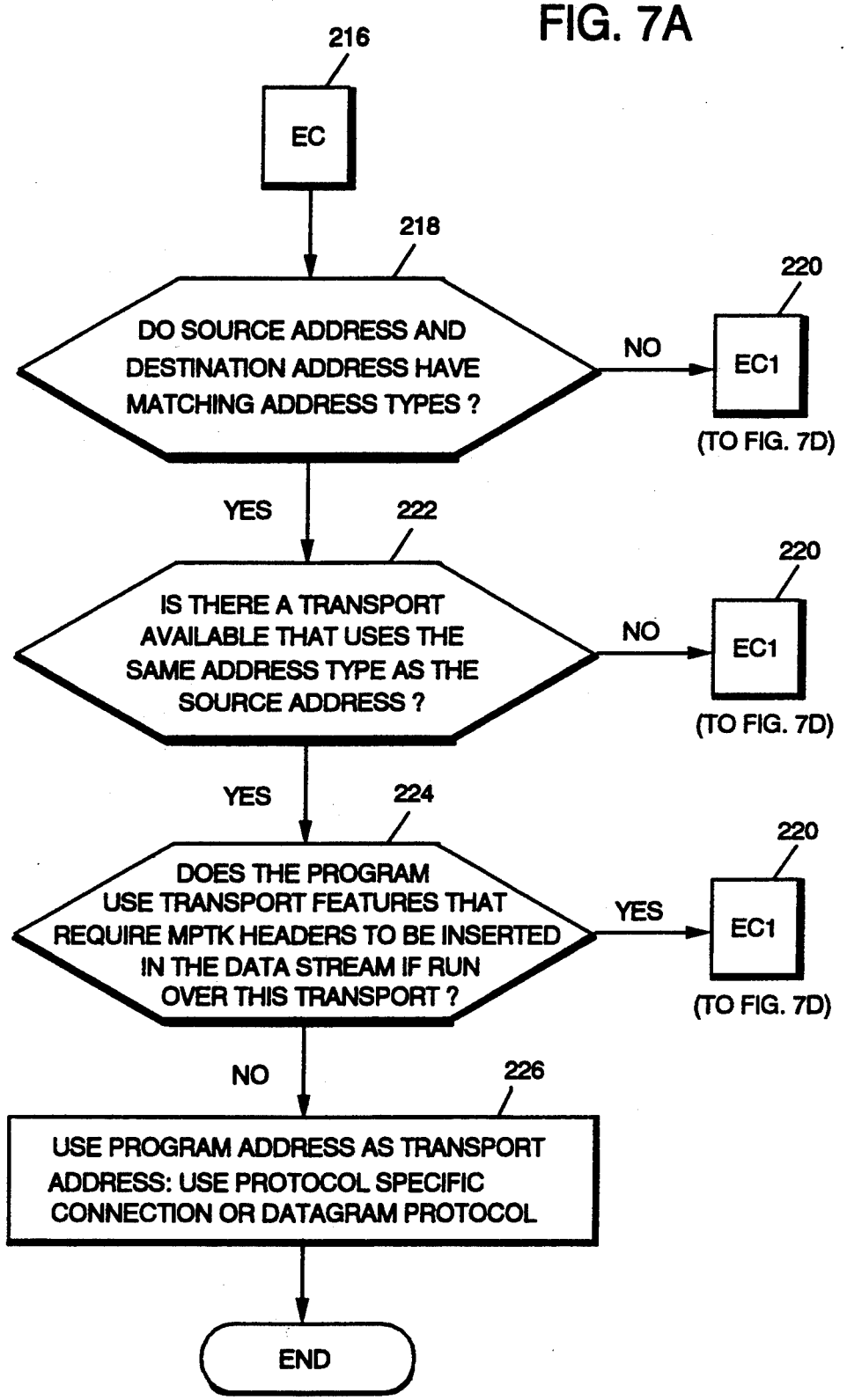

PROTOCOL SELECTION AND ADDRESS RESOLUTION FOR PROGRAMS RUNNING IN HETEROGENEOUS NETWORKS

This application is closely related to our own, commonly assigned U.S. Pat. No. 5,224,098, having an issue date of Jun. 29, 1994, entitled "Compensation for Mismatched Transport Protocols in a Data Communication Network". The patent describes a Multi-Protocol Transport Networking (MPTN) Architecture which allows an application program running at one node in a network to communicate with a second application program running at another node in the network even where the application programming interface (API) assumes a different set of transport functions than those supported by the transport provider. In particular, it relates to a method for establishing communication, either connectionless or with a connection, between the applications and compensating for transport protocol mismatches, if any. The present invention relates to address resolution and protocol selection among multiple transport protocols for the applications and the nodes in the MPTN.

BACKGROUND OF THE INVENTION

I. Field of the Invention

The present invention relates to data communications and more particularly to methods of resolving addressing differences between applications and networking protocols and for selecting from a choice of networking protocols when multiple protocols are available.

II. Prior Art

As communications networks have evolved, independent suppliers of computer hardware and software developed different, non-compatible formats and protocols for transporting data through the communications networks. Examples of well-known communications protocols include System Network Architecture (SNA), Digital Network Architecture (DECnet), Transmission Control Protocol/Internet Protocol (TCP/IP), NetBIOS and OSI.

As networks have grown, and particularly as local area networks have come into widespread use, many organizations have ended up with confederations of individual networks running different networking protocols. For example, a single organization may have dozens of networks running as many as four or five different networking protocols. This heterogeneity complicates the network communication as distributed programs are generally written for a particular application programming interface (API) which assumes a specific networking protocol, and can, therefore, only run on limited parts of the overall network.

If a mismatch exists between the transport protocols (the most basic end-to-end networking protocols for opening and closing connections, sending and receiving data on connections, and sending and receiving datagrams) assumed by the particular API for a company's application program and the transport protocols actually implemented in one or more of the networks on which the company would like to transport the application data, compensation between the API and the network may be required. This is described in greater detail in closely related issued U.S. Pat. No. 5,224,098.

In addition, there are addressing problems associated with the heterogeneous networks. A program today identifies itself and finds its partners using addresses associated with a particular networking protocol. (A networking protocol uses addresses to locate programs in the network via existing protocol-specific means, such as local directory searches or directory broadcasts and to route to those programs.) In order for the program to operate over multiple, different networking protocols, a mechanism is needed to bridge the gap between the specific address set used by the program and the address sets used by the networking protocols. In particular, program independence from specific network protocols requires a transport-independent mechanism for finding the source and destination application programs and the corresponding available transport protocols. In addition, a mechanism for selecting the best transport protocol to utilize, when multiple networking protocols are available, is required.

Since many programs already exist using existing address formats, it is not feasible to require all programs, including those in existence, to use a single standard address format. Likewise, it is not feasible to change all existing transport protocols to support the complete list of address formats used by application programs or to use a single standard format.

The work described here is different from that defined in the TCP/IP Requests for Comments (RFCs) 1001 and 1002 in that the RFCs solve the problem for a specific transport user and transport provider, but do not address the general mechanism needed to support many different types of users or providers. The work also differs from an application directory, such as OSI's X.500, in that its dynamic nature is more akin to a networking directory and it does not deal with name to address mapping with their associated complexities.

In addition, where a source application program is able to communicate with a destination partner program over one of multiple transport providers, the most efficient provider should be chosen. At present, no method of selecting the best transport provider based on services provided when more than one are available is known.

SUMMARY OF THE INVENTION

The present invention is a general solution to the problem of address incompatibility between application programs and transport services. The invention may be embodied in a method of mapping the application program address (program address) to the transport services address (transport provider address). According to the method, a program address is registered in the network so that it becomes available to other programs that understand the address, even if the transport-level communication is over a transport protocol that does not understand the program address format. When a request is made that a connection be established between a program and a program partner or that a datagram be sent therebetween, a transport provider is selected to minimize compensation required and the program address is mapped to the transport provider address (if necessary). The program address is then conveyed to the program partner so that it knows to whom it is talking.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 4 is a diagram showing possible contents of the Address Registry of the present invention.

FIGS. 7A through 7E illustrate the same logic flow in greater detail.

DETAILED DESCRIPTION OF THE PREFERRED EMBODIMENT

Figure 1:
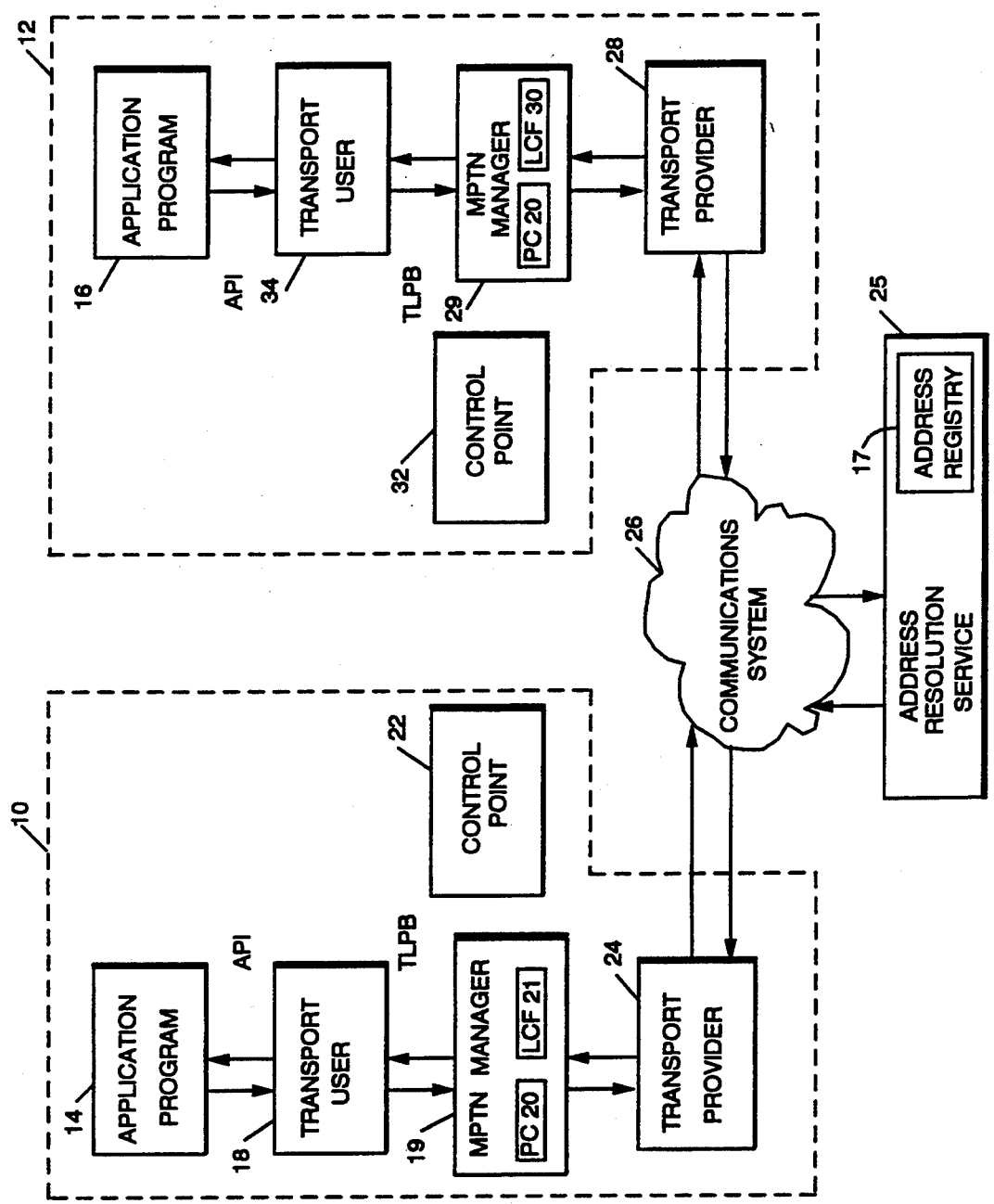
FIG. 1 is a block diagram of a two-node computer network, showing the functional representations of major elements of the present invention.

FIG. 1 is a high-level block diagram of a simple computer network consisting of a first multi-protocol transport network (MPTN) access node 10, a second MPTN access node 12 and an intervening communications system 26 through which an application program 14 in access node 10 may exchange data with an application program in access node 12.

Referring first to access node 10, the application program 14 communicates with the remainder of the network by sending and receiving commands and data, frequently referred to as primitives. The primitives are provided by the application programming interface or API that was employed in writing the application program.

The primitives flow to and from a transport user 18, the role of which is to convert application primitives to standard representations referred to as transport layer protocol boundary (TLPB) functions. The TLPB contains verbs which perform major transport functions such as opening connections, sending and receiving data and closing connections. Most application programs need only a limited set of TLPB functions. If the application program is written directly to the TLPB, the transport user function would be integrated into the application program. The TLPB functions are described for completeness of disclosure but are not required for the implementation of the present invention.

Transport user 18 may be logically linked to an MPTN manager 19. The transport user and the MPTN manager will operate under the control of a control point 22 in node 10. The MPTN manager 19 is tied to the communication system 26 through a transport protocol stack or transport provider 24.

Transport provider 24 defines the transport protocols that are actually implemented when the data is exchanged between the two nodes over the communication system 26. Examples of transport providers are layers 1–4 of OSI, NetBIOS, and TCP/IP.

The MPTN manager 19 may comprise a protocol compensator (PC) 20 and a local control function (LCF) 21. Protocol compensator 20 compensates for mismatches between the protocol followed by a TLPB verb and the protocol followed by a corresponding verb or function in transport provider 24 and vice versa. It is in this way that the differences between the transport protocol to which the application was written to and the actual transport protocol are compensated for. This is described in great detail in related copending application Ser. No. 07/731,564.

Local control function 21 supports non-native connections or datagrams to and from the node by performing address registration, protocol selection and address resolution. This will be discussed in greater detail below.

MPTN access node 12 contains its own transport user 34, MPTN manager 29, protocol compensator 30, local control function 23, control point 32 and transport provider 28. These components perform the same basic functions as the corresponding components in node 10.

As can be seen, the computer network further comprises an address resolution service 25 connected to the communications system 26. Address resolution service 25 is accessible by all nodes connected to communications system 26 and provides a multi-protocol Address Registry 27 for the network. This, also, will be discussed in greater detail below.

In order to establish a connection or to send datagrams, proper addresses must be used, both within the node and within the network. For instance, a transport user conforming to a particular transport protocol, e.g., OSI, uses a particular addressing scheme. Likewise, a transport provider conforming to a different protocol, e.g., SNA, has different addressing characteristics. Ambiguities or mismatches between the different ("non-native") schemes must be resolved so that communication may take place.

In contrast, an SNA transport user and an SNA provider have no addressing ambiguities or mismatches as they are "native" to one another.

Figure 2:
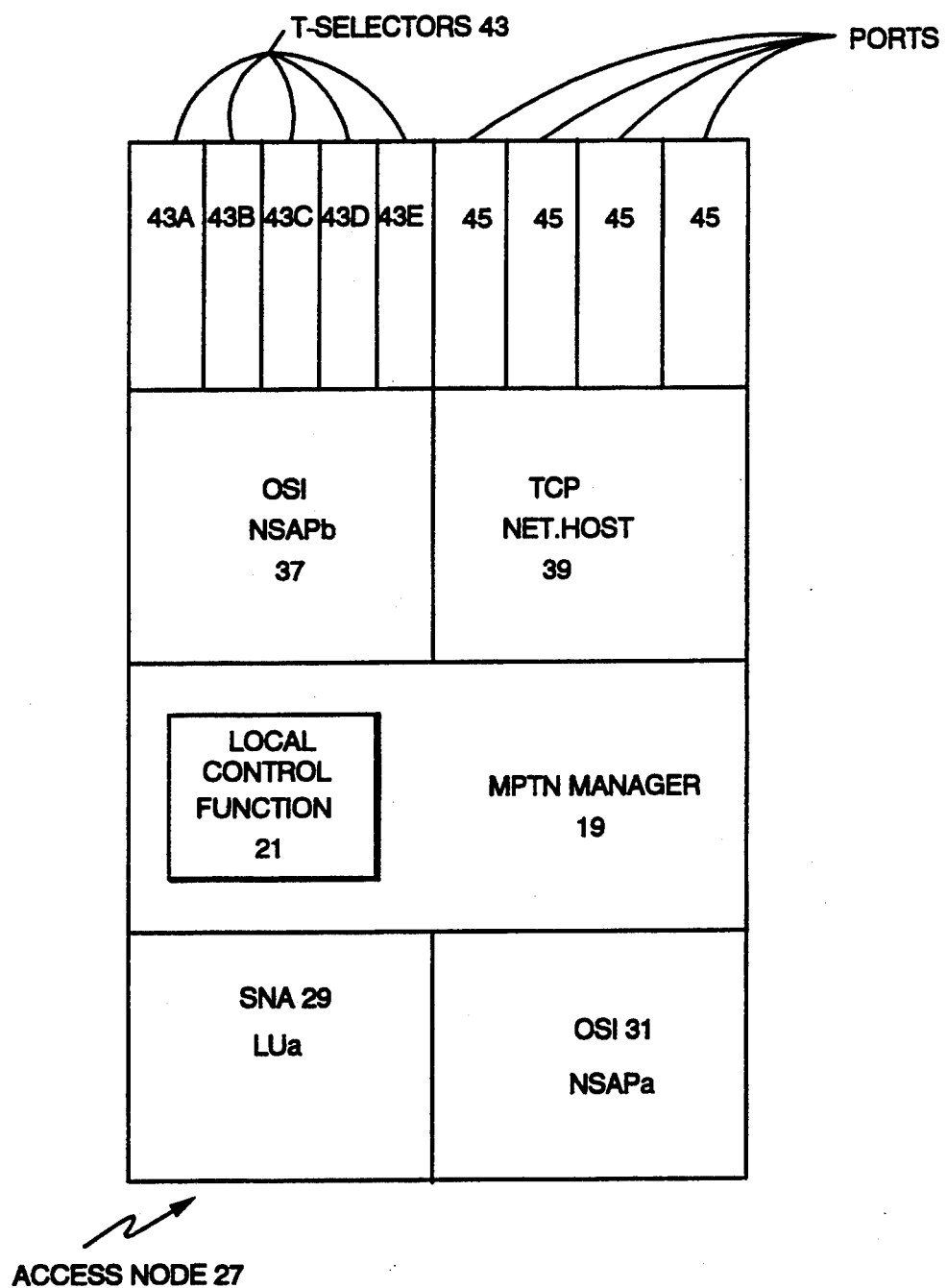
FIG. 2 is a diagram showing a possible logical configuration of an MPTN access node.

In an MPTN access node, there may be a number of application programs, a number of different users, and a number of different providers. For example, in FIG. 2, a possible logical configuration of an MPTN access node 27 is shown. In this case, MPTN access node 27 is supported by two providers, SNA 29 (logical unit (LU) a) and OSI 31 (node service access point (NSAP) a), and has two users, OSI 37 (NSAPb) and TCP 39 (NET.HOST). Each user supports a number of programs, OSI 37 supporting programs identified by "T-selectors" 43, and TCP 39 supporting programs identified by "ports" 45. As discussed above, each of these different application programs was written for a different API and, therefore, each has different addressing formats and identifiers. Likewise, the users have different addressing formats and identifiers.

In addition, MPTN access node 27 has an MPTN Manager 19, as previously discussed. MPTN Manager 19, among other things, must keep track of which application programs are locally active, i.e., which programs are registered for sending and receiving datagrams or for being connected with partner programs. This is done by local control function 21.

The local control function 21 accomplishes this by keeping track of the various addresses of the different local users in its own local directory. For instance, if programs with five T-selectors 43a, 43b, 43c, 43d, and 43e are registered for communication, local control function 21 keeps track of the programs in a local directory with the user address, OSI NSAPa, and the program addresses, T-selectors 43a, 43b, 43c, 43d, and 43e. In a similar manner, the local control function can keep track of active TCP programs with ports 45 with their user address, TCP NET.HOST. The generic term to be used in this document to describe the program addresses maintained by the local control function is "programid" so that the programid for T-selector 43a is "T-selector-43a, NSAPa" (program identifier with user identifier).

If the transport provider and the program (or user) use the same address type, the program is said to be "native" to the transport provider. In the example shown in FIG. 2, T-selector 43a and transport user OSI NSAPa 37 are native to transport provider OSI NSAPa 31. Where a native program is to communicate, the transport provider conveys the address and no address mapping or address resolution is necessary. Similarly, no compensation is required.

A program is "non-native" with respect to a particular transport provider if it uses different address types than the transport provider or if it requires transport characteristics that require compensation over the transport provider. Where a program is running over a non-native protocol, such as T-selector 43a running over provider SNA 29, address mapping is necessary.

Where a program (and user) is supported by a number of providers, the local control function determines which of the providers is best suited for conveying the information. The local control function maintains one or more connection preference lists and datagram preference lists, i.e., lists in preference order of the providers that could potentially provide connections or datagram services. The lists are ordered based upon the list of available transport protocols in the node and the transport characteristics requested by the program. For example, if a program requests expedited data service, the local control function arranges the preference list so that transport protocols that support expedited data natively are preferred over those that do not.

Figure 3:
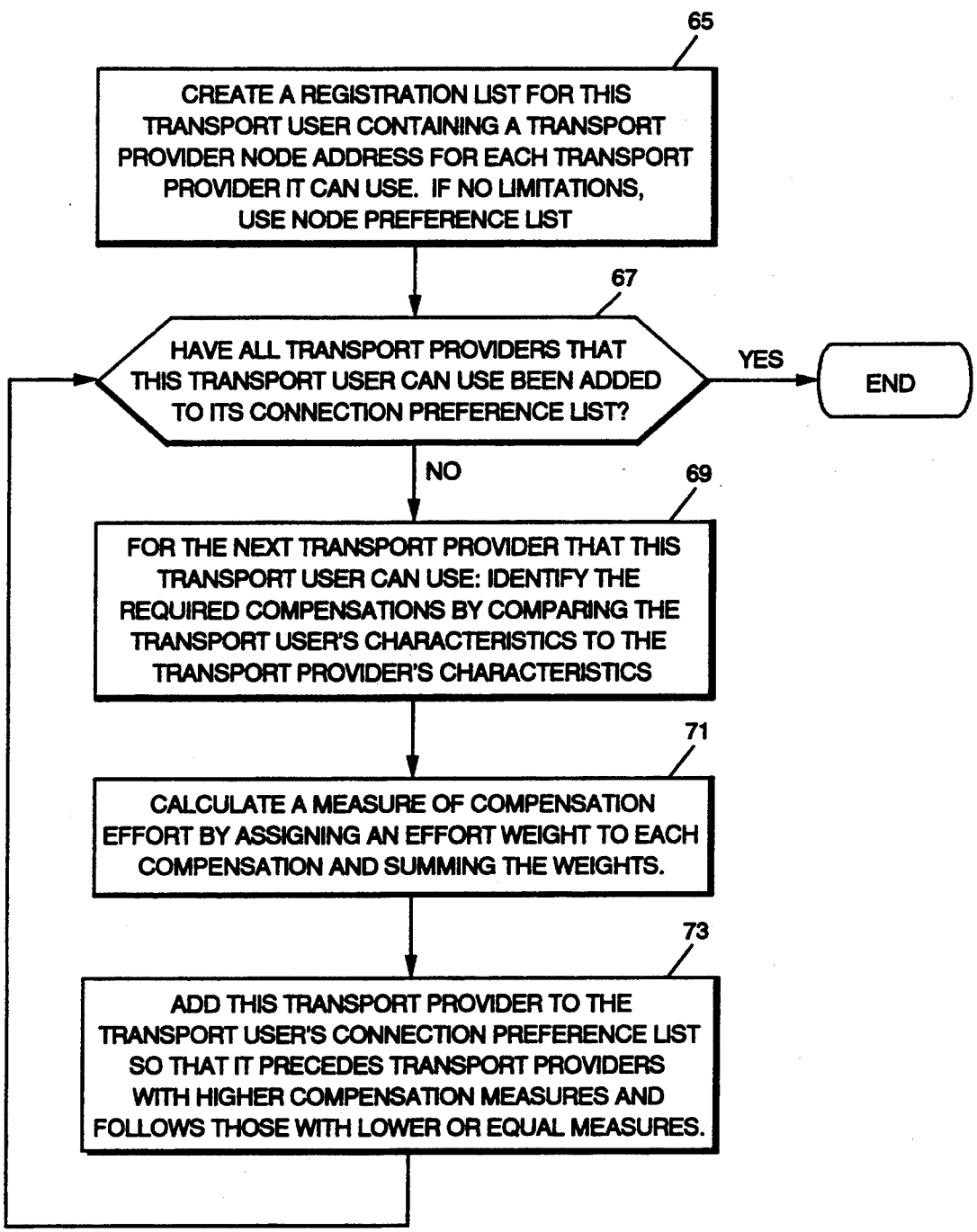
FIG. 3 is a flow diagram showing the logic flow of the Local Control Function in an MPTN access node during the protocol preference selection process.

FIG. 3 is a flow diagram showing the logic flow of the Local Control Function in an MPTN access node during the protocol selection process. At step 65, a registration list for the particular transport user is created containing a transport provider node address for each transport provider the transport user can use. If there are no limitations, the node preference list is used. At step 67, the Local Control Function insures that all transport providers that the particular transport user can use have been added to the transport user's connection preference list. At step 69, the Local Control Function identifies the required compensations for the next transport provider that this transport user can use by comparing the transport user's characteristics to the transport provider's characteristics. At step 71, the Local Control Function calculates a measure of compensation effort in assigning an effort weight to each compensation and summing the weights. At step 73, this transport provider is added to the transport user's connection preference list so that it precedes transport providers with higher compensation measures and follows those with lower or equal compensation measures.

An example of the protocol selection process is illustrated in the following Tables 1, 2 and 3. Table 1 illustrates four compensations, e, f, g and h, and their respective effort weights, 1, 1, 2 and 2. As noted above, the effort weight associated with each of the compensations is a measure of the effort required to provide compensation between the transport user and the transport provider. For example, compensation e with an effort weight of 1 takes less effort than compensation g with an effort weight of 2.

Table 2 illustrates four example protocols, A, B, C and D, and the compensations required by each of the particular protocols. For instance, protocol A requires compensations e and f, protocol B requires compensations g and h, protocol C requires compensation g, and protocol D requires all four compensations, e, f, g and h.

Table 3 illustrates the preference list for the protocols A, B, C and D in accordance with the protocol selection method of the present invention. In particular, protocol A, which requires compensations e and f having effort weights, respectively, has an overall weighting of 2. Protocol B, which requires compensations g and h, having effort weights of 2 and 2 respectively, has an overall weight of 4. Protocol C which requires compensation g, having an effort weight of 2, has an overall weight of 2. Finally, protocol D, which requires compensations e, f, g and h, having effort weights of 1, 1, 2 and 2, respectively, has an overall weight of 6. The order of the preference list is from the least total effort weight to the greatest total effort weight. In the present example, the preference list has the order of protocol A, protocol C, protocol B and then protocol D, so that where a particular transport user with characteristics requiring the compensations listed in Table 2 is serviced by each of the four protocols A, B, C and D, protocol A would be chosen to provide the particular service. Where a particular transport user with characteristics requiring the compensations listed in Table 2 is serviced by only protocols C and D, the Local Control Function would select protocol C for providing the service.

TABLE 1

| Comp | Effort Wt |
|------|-----------|
| e | 1 |
| f | 1 |
| g | 2 |
| h | 2 |

TABLE 2

| Protocol | Comps Needed |
|----------|--------------|
| A | e, f |
| B | g, h |
| C | g |
| D | e, f, g, h |

TABLE 3

| Protocol | Weight | Order |
|----------|--------|-------|
| A | 1 + 1 = 2 | 1 |
| B | 2 + 2 = 4 | 3 |
| C | 2 | 2 |
| D | 1 + 1 + 2 + 2 = 6 | 4 |

For many protocols, such as SNA and OSI, addresses consist of a provider identifier and a local identifier. The provider identifier identifies the particular provider which is servicing the program while the local identifier specifies where in the node the program is located. Other protocols, such as NetBIOS, do not utilize two-part addressing schemes.

Address resolution service 25 (FIG. 1) may comprise one or more multi-protocol Address Registry which includes every user address that can be accessed over the transport protocols it serves. In some cases, address resolution service can be provided without an Address Registry. For example, if only minimal services are required and the transport user address space is more constrained than the provider's address, an algorithmic mapping can be used between the two. This can be done, for example with IP user addresses and SNA provider addresses. Likewise, some network directories can be extended to support additional address types; when these networks act as providers, they are capable of providing address resolution services.

The remainder of this specification assumes that a registry is in use even when other methods are available. Within the Registry, each user address is associated with the transport provider addresses that can be used to access it. An example of a multi-protocol Address Registry is shown in FIG. 4 where each user (USER 1, USER 2, USER 3 and USER Z) has a user identifier having a "TYPE" field for identifying the particular protocol it conforms to and a user identifier ("USER 1", etc.) and one or more provider addresses, depending upon how many protocols each user is supported by, each having a provider identifier field. For instance, USER 1 is supported by PROTOCOL 1 and PROTOCOL 2 and, therefore, has two different provider IDs (PROV$_1$ and PROV$_2$). USER Z, on the other hand, is supported by all three protocols, PROTOCOL 1, PROTOCOL 2, and PROTOCOL Z and therefore has three different provider IDs, one of each protocol type.

The Address Registry is dynamically updated with the addresses of programs which become available to the MPTN. Address resolution services 25 associates the transport user with at least one transport provider when the transport user (via the local control function) registers its address. This makes the transport user accessible to other transport users in the network. The address resolution service 25 verifies the uniqueness of the address if the transport user address type requires dynamic verification of uniqueness (e.g., as in NetBIOS).

When it becomes active, a program registers its address via the local control function. It may register as an individual (for receiving messages from partner programs on an individual basis) and it may associate itself with a group address in order to receive multicast diagrams. For various non-native transport protocols to be used, the control function sends Register messages to the associated Address Registry in order to register the program address so that it can be located by partner programs over the non-native transport protocols. Each Register message includes the user address and the provider address for each transport protocol serving the particular user, as well as an indicator as to whether the user is registering as an individual or group address.

In a similar manner, a user may deregister with the Local Control Function, or become inactive, by sending a Deregister command to the Registry.

Programs use the Registry for finding partner programs. For example, if a particular program wished to communicate with a program utilizing USER 1 (shown in FIG. 4), it could, from the information in the Registry, determine what type of and which particular providers could be used.

This process can be employed in one particular network type or between two or more network types. For example, where there are two networks N1 and N2 of different types (for example, TCP/IP and OSI). Connected by a gateway, using the present invention, a program at a node in NI employing an SNA user (for instance) may communicate over a TCP/IP network N1 to an OSI network N2 via gateway to a partner program at a node in N2 being also being serviced by an SNA user. This is accomplished by having a registry servicing each network.

The process by which the program addresses are registered and deregistered and are subsequently located can be thought of as involving four separate procedures. First (FIG. 5), the Local Control Function controls the individual and group address registration/deregistration of its respective programs by communicating with its Users and the Registry. Second (FIG. 6), the Registry communicates with various local control functions as well as gateways for registering and deregistering addresses. Third (FIG. 7), the Local Control Function establishes connections and sends/receives datagrams with partner programs. Fourth (FIG. 8), the Registry communicates with local control functions and gateways for connecting or conveying datagrams between partner programs. FIGS. 5, 6, 7 and 8 are shown at a high level and corresponding figures (FIGS. 5A, 5B, 5C, 5D, 5E, 5F and 5G; FIGS. 6A, 6B, 6C, 6D and 6E; FIGS. 7A, 7B, 7C, 7D and 7E; FIGS. 8A and 8B, respectively) show greater detail.

Address Registration/Deregistration

Figure 5:
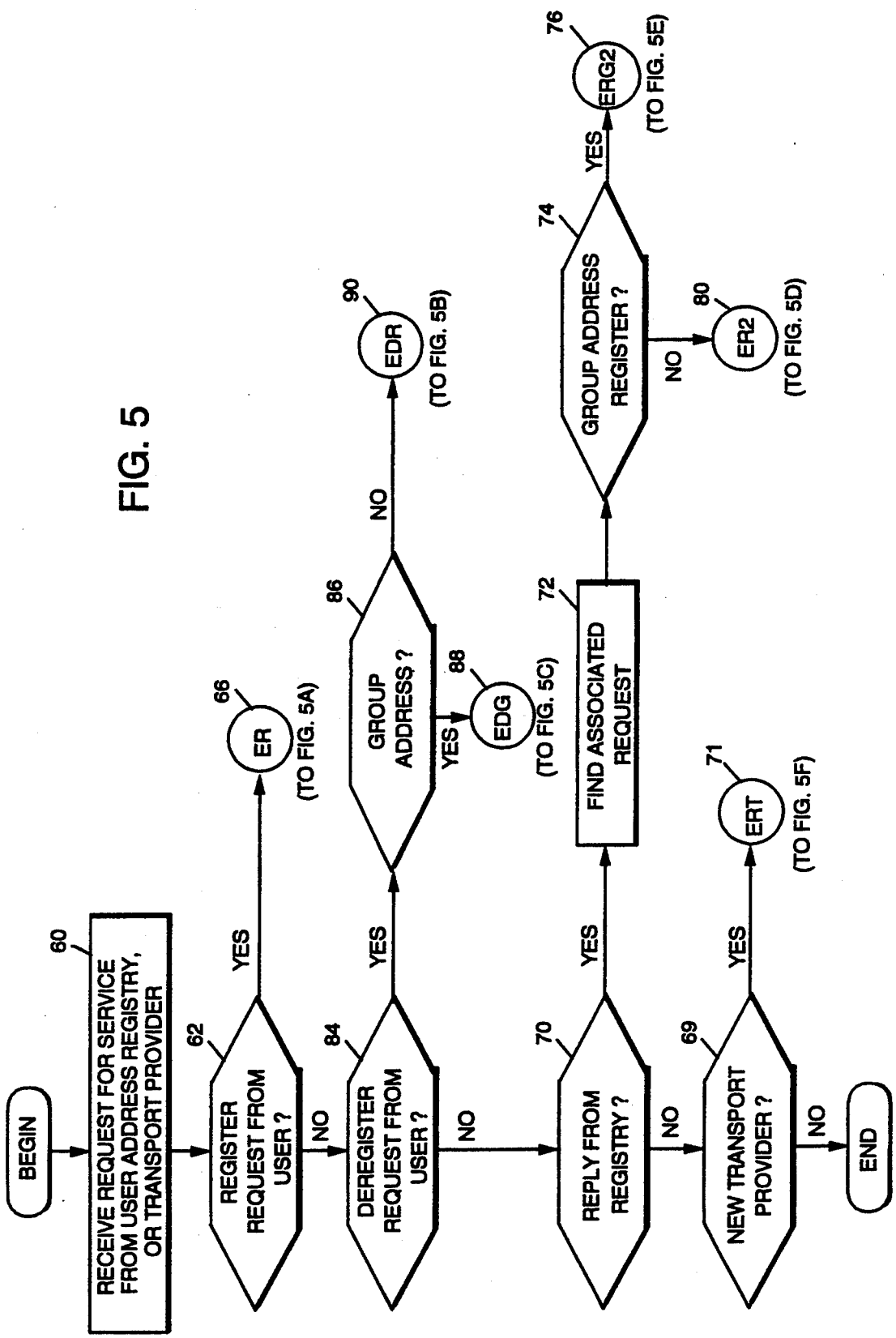
FIG. 5 is a high level flow diagram showing the logic flow of the Local Control Function in an MPTN access node during the registration/deregistration process of a user address.
Figure 5A:
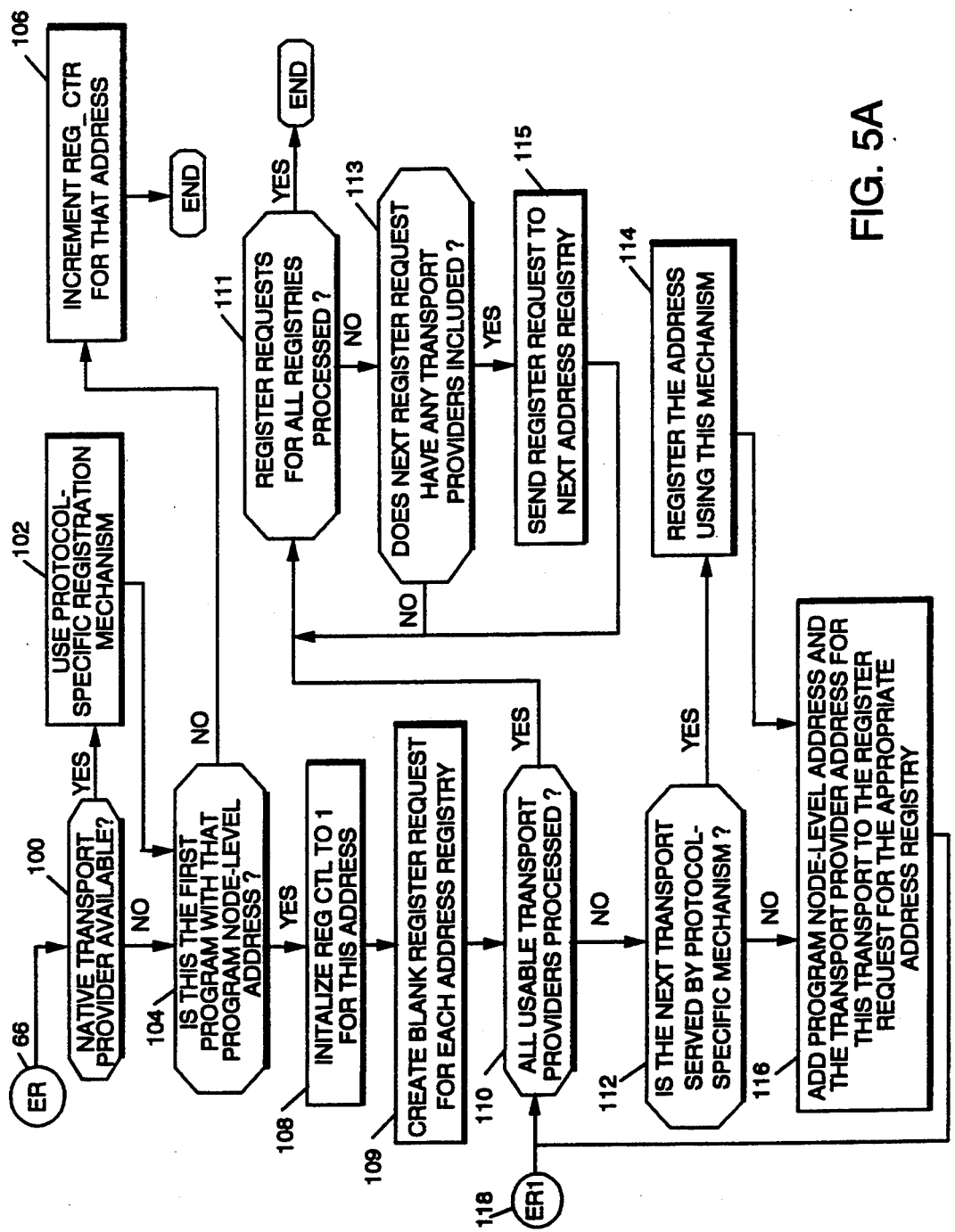
FIGS. 5A through 5F illustrate the same logic flow in greater detail.

In FIG. 5, initially, the Local Control Function receives a request for service from the Transport User (User), the Address Registry (via the transport Provider), or the Transport Provider itself (if an additional Provider is being added at the node) at step 60 and the Local Control Function determines which message is received. If the message is a Register request from the User at step 62, the address registration process shown in FIG. 5A is invoked at "ER" (step 66).

If the request for service is a Deregister request from a User at step 84, the Local Control Function determines, at step 86, whether it is a group address or an individual address for further processing at "EDG" (step 88) or "EDR" (step 90), respectively.

Figure 5B:
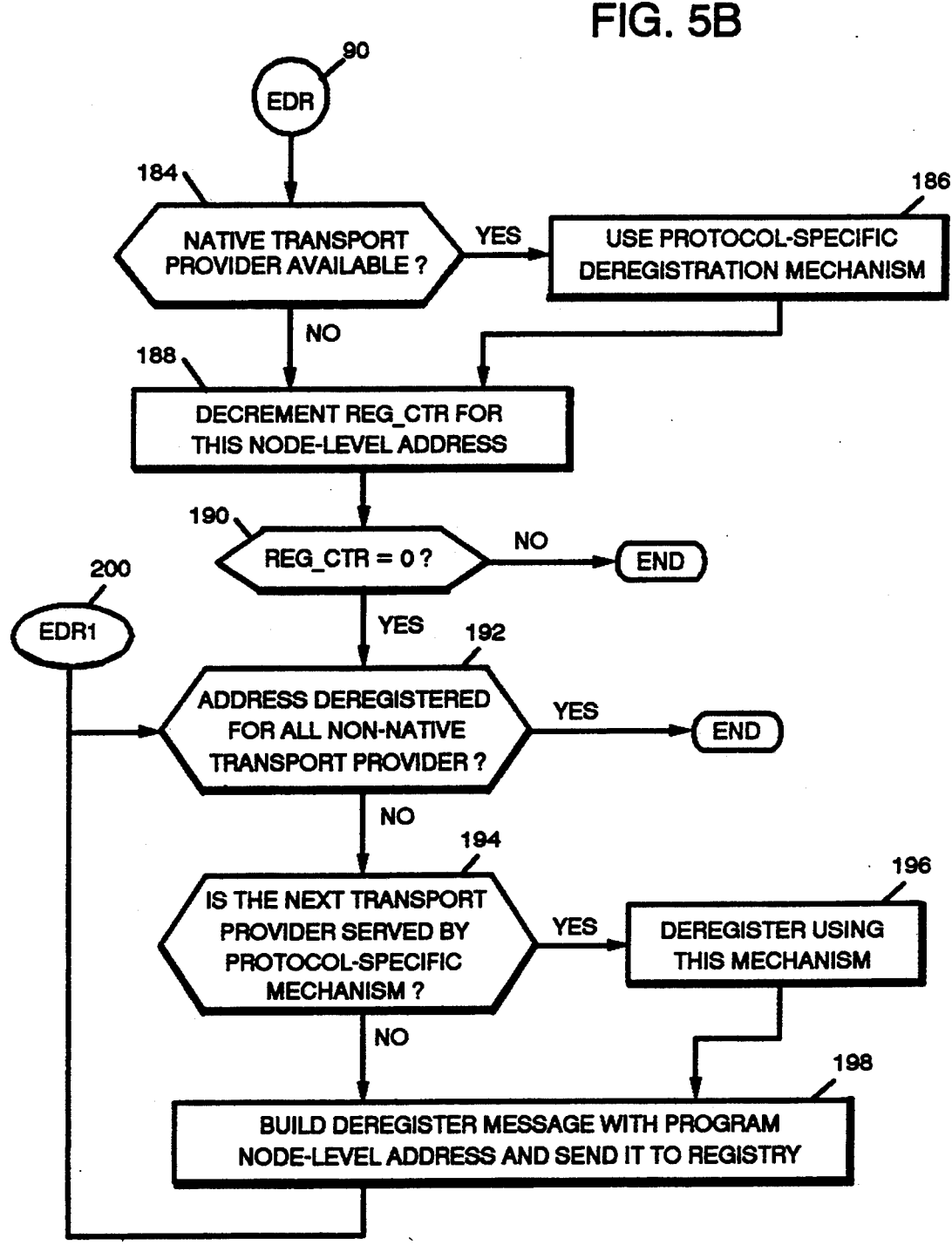
Figure 5C:
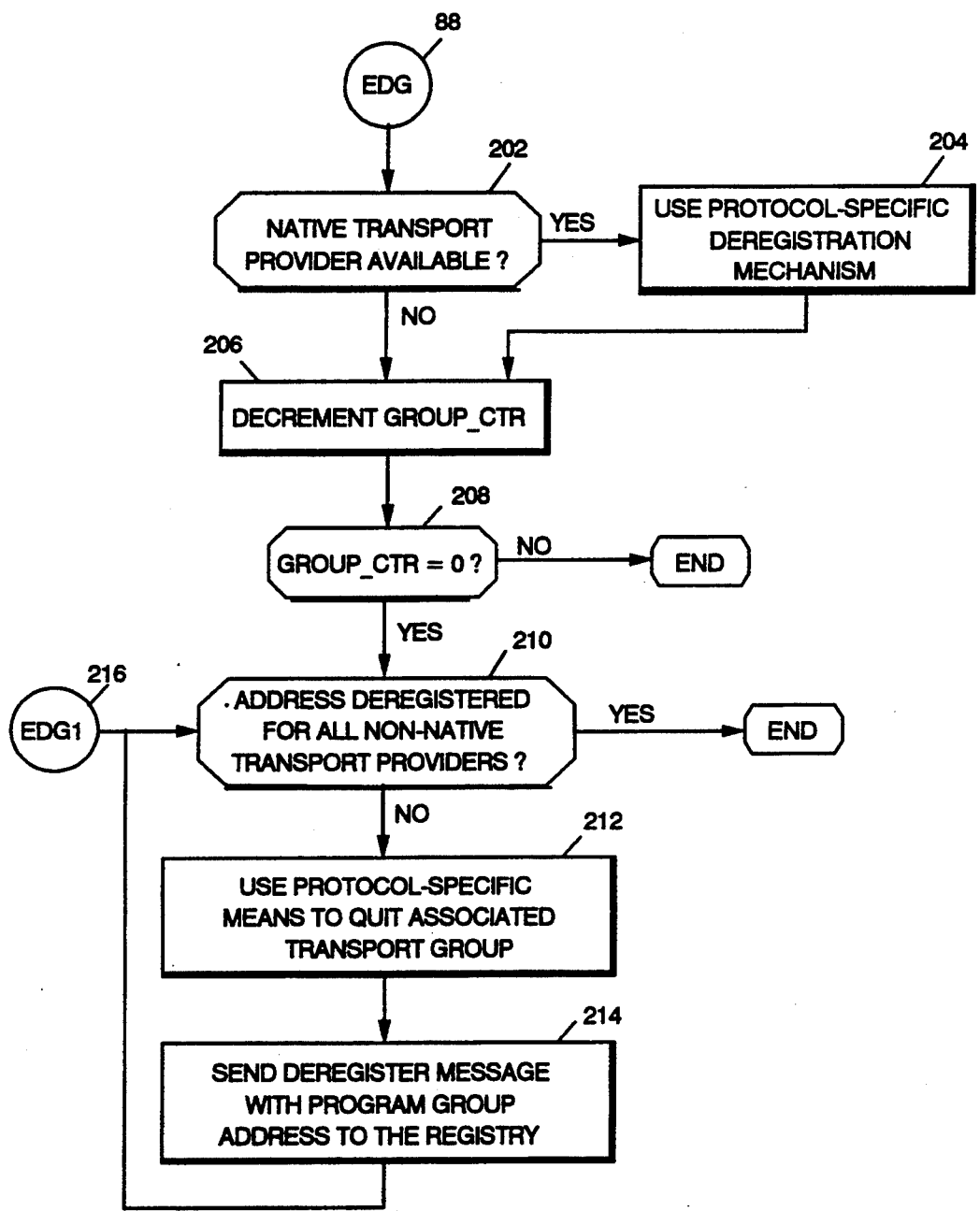
Figure 5D:
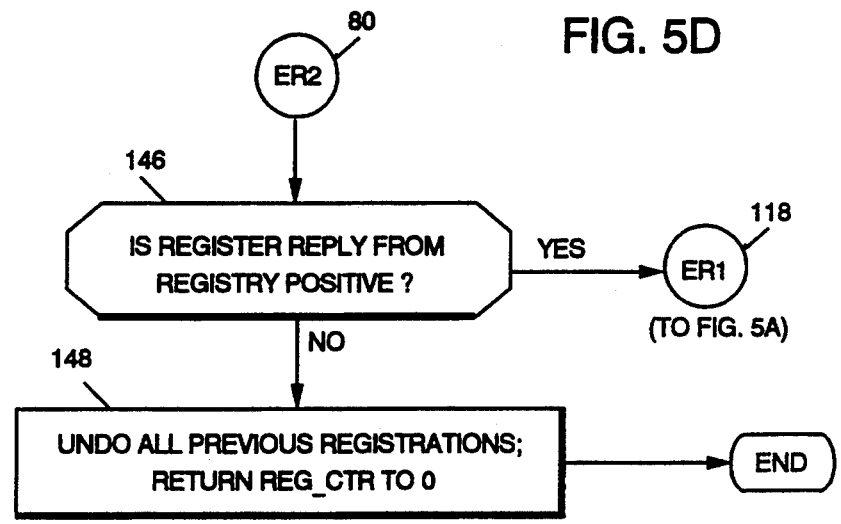
Figure 5E:
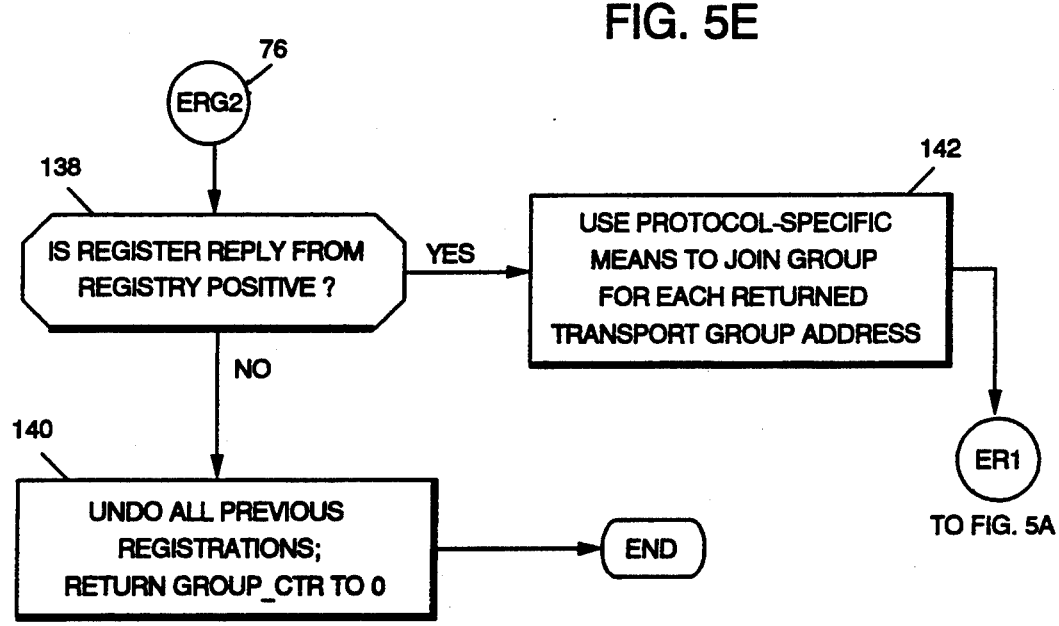

If the request for service is a reply to a Register request from the Address Registry at step 70, the Local Control Function finds the associated request at step 72 to determine, at step 74, whether it is a group address (where "ERG2" process of FIG. 5E (at step 76) is invoked), or whether it is an individual address at step 78 (where the "ER2" process of FIG. 5D (at step 80) is invoked).

If the request for service is a request for adding a transport Provider at 69, "ERT" 71 of FIG. 5G is invoked.

The address registration process ("ER" at step 66 of FIG. 5) is shown in greater detail in FIG. 5A. The Local Control Function determines at 100 whether or not the native transport Provider to the program is available. If it is, a protocol-specific registration mechanism is used at 102. An example of a protocol-specific mechanism is where, in NetBIOS, the name to be registered is broadcast to ensure that it is not being presently used by another. The Local Control Function then determines whether the requester program is the first with that User (program node-level) address at 104, for example, the first T-selector with a particular OSI NSAP transport User. If not, the counter (Regctr) for that address is incremented at 106 and the process is complete as that particular User address has already been registered at the Registry. If it is the first use, Regctr is initialized at 108 and the registration process continues. The counter is utilized so that the Local Control Function may be able to maintain how many programs are using the particular User. The counter is incremented for each new program using a particular User registered at the Registry and is decremented for each program going inactive. When the counter reaches zero, the User address is removed from the Registry.

At step 109, the Local Control Function creates a "blank" Register request for each Address Registry with which the access node communicates as there may be more than one Registry communicating with the access node. A "blank" Register request has no transport Providers therein. At 110, the Local Control Function determines whether the address is registered for all non-native transports which are available. If so, the Local Control Function determines at 111 whether the Register requests for all of the Address Registries have been processed. If so, the registration process is complete. If not, the Local Control Function determines, at 113, whether the next Register request has any transport Providers included. If so, Local Control Function sends the Register request to the next Address Registry at 115 and returns to 111 to ensure that the Register request has been processed for all Address Registries.

If all useable transport Providers have not been processed at 110, the Local Control Function determines whether the next transport Provider to be registered with the program is served by a protocol-specific mechanism at 112. If so, the address is registered using this mechanism at 114. Examples of protocol-specific mechanisms which support a transport protocol are where an algorithm is used to map the User to the Provider or where there is a native directory in the network for retrieving non-native names, e.g., an extension to TCP's Domain Name Server (DNS) to treat the User's protocol as a domain.

The Local Control Function then registers the address by adding the provider address to the register request for the appropriate address registry, at 116. The Local Control Function then ensures that the program has an address registered for all of the available transports at 118.

Referring again to FIG. 5, if the message is a deregister request, at 84, for an individual address at 86, "EDR" 90 of FIG. 5B is invoked. At 184, the Local Control Function determines whether a native transport Provider is available. If so, the protocol-specific deregistration mechanism is used at 186. The RegCtr for this node-level address is decremented. If RegCtr does not equal zero at 190, the process is complete. (As noted, RegCtr is used for counting the number of programs using a particular User. If there are other programs using that particular Transport User, the Transport User address needs to be left in the Registry.) If RegCtr does equal zero, and the address is deregistered for all non-native transport Providers at 192, the process is complete. If the address has not been deregistered for all nonnative transport Providers, the Local Control Function determines whether the next transport Provider has a protocol-specific address registration at 194. If so, at 196, the protocol-specific deregistration mechanism is used. The Local Control Function builds a Deregister message with the program node-level address and sends it to the Registry at 198. The Local Control Function ensures that the address has been deregistered for all non-native transports at 192 via "EDRI" 200.

If, however, the message is a deregister request at 84 for a group address "EDG" 88 of FIG. 5C is invoked. If a native transport Provider is available at 202, the protocol-specific mechanism for removing the program from the group is used at 204. The group size is decremented at 206 and, at 208, if the group size does not equal zero, the process is complete. If the group size is zero, the Local Control Function determines whether the group address has been deregistered for all non-native transports at 210. If it has not, the protocol-specific means to quit the associated transport group is used at 212. A Deregister message is sent to the Registry with the program group address at 214. The Local Control Function ensures that the group address has been deregistered for all non-native transport Providers at 210 via "EDG1" 216.

Figure 5F:
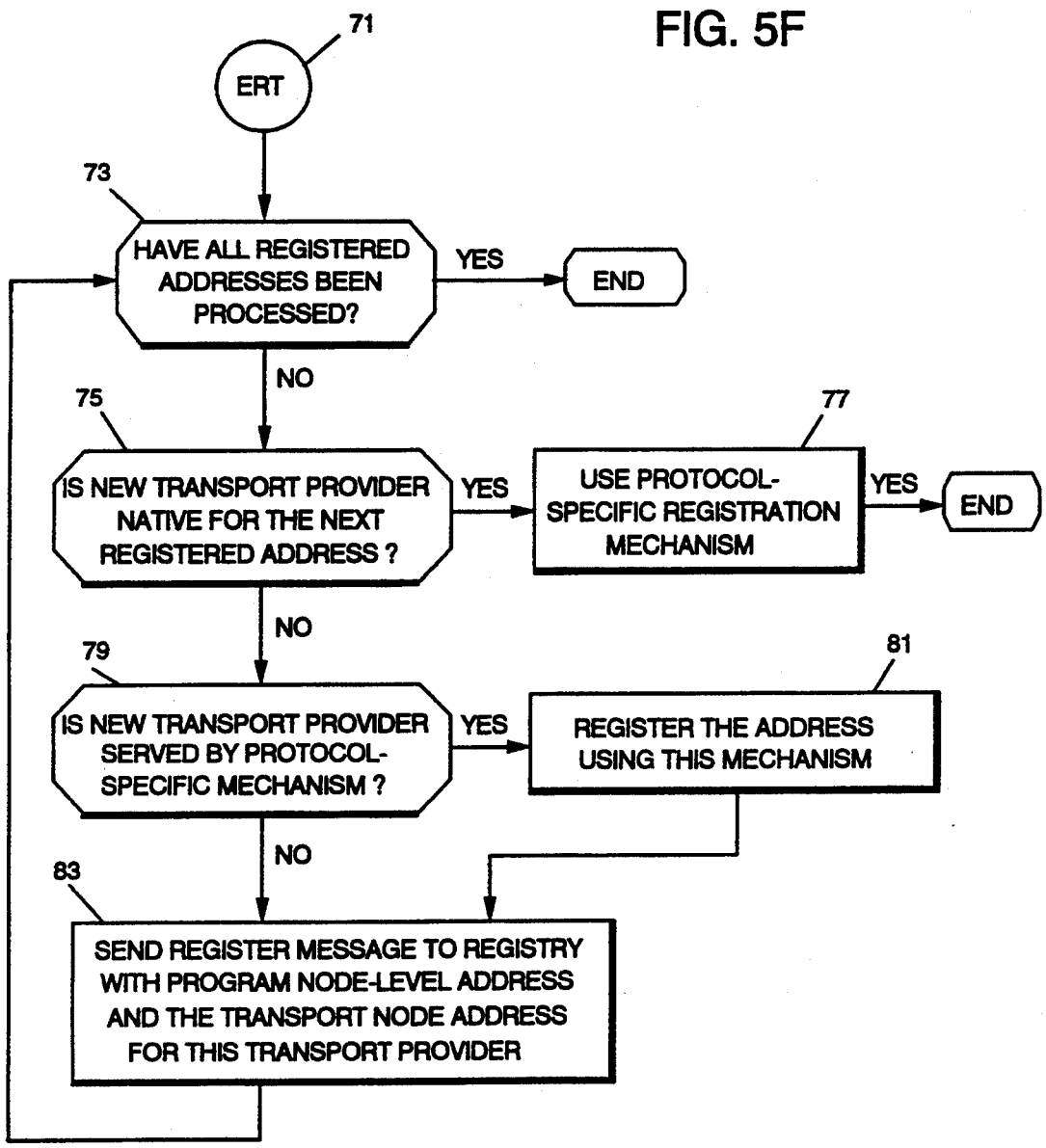

Referring again to FIG. 5, where the message is a reply to a Register request from the Registry and is for a group address (at "ERG2" 76), the Local Control Function determines whether the Register reply is positive or negative at 138 in FIG. 5E. If negative, i.e., the address is used by another in the network, the Local Control Function undoes all previous registrations (native and non-native) and returns GroupCtr to "0" at 140. If it is positive, Local Control Function uses the protocol-specific mechanism to join group for each returned transport group address at 142. Transport Providers have functions that need to be invoked in order to join a group. This may be as simple as setting an entry in a table that indicates that this value should be accepted. The Local Control Function then ensures that the address is registered for all non-native transport Providers at 130 as discussed above.

Where the message is a reply from the Registry and is for an individual address (at "ER2" 80), Local Control Function, at 146 in FIG. 5D, determines whether the reply is positive (if so, go to "ER1" 118 at FIG. 5A) or negative where the Local Control Function undoes all previous registrations and returns RegCtr to "0".

Where the request for service in FIG. 5 is a request from a Transport Provider to be added for service by the Local Control Function, "ERT" 71 of FIG. 5F is invoked. At 73, the Local Control Function determines whether all registered addresses have been processed. If so, the process is complete. If there is a registered address not processed, and the new transport Provider is native to that address at 75, the protocol-specific registration mechanism is used at 77. If the new transport is served by a protocol-specific mechanism at 79, the address is registered using this mechanism at 81. The Local Control Function sends a Register message to the Registry with the program node-level address and the transport node address for this transport Provider at 83.

Figure 6:
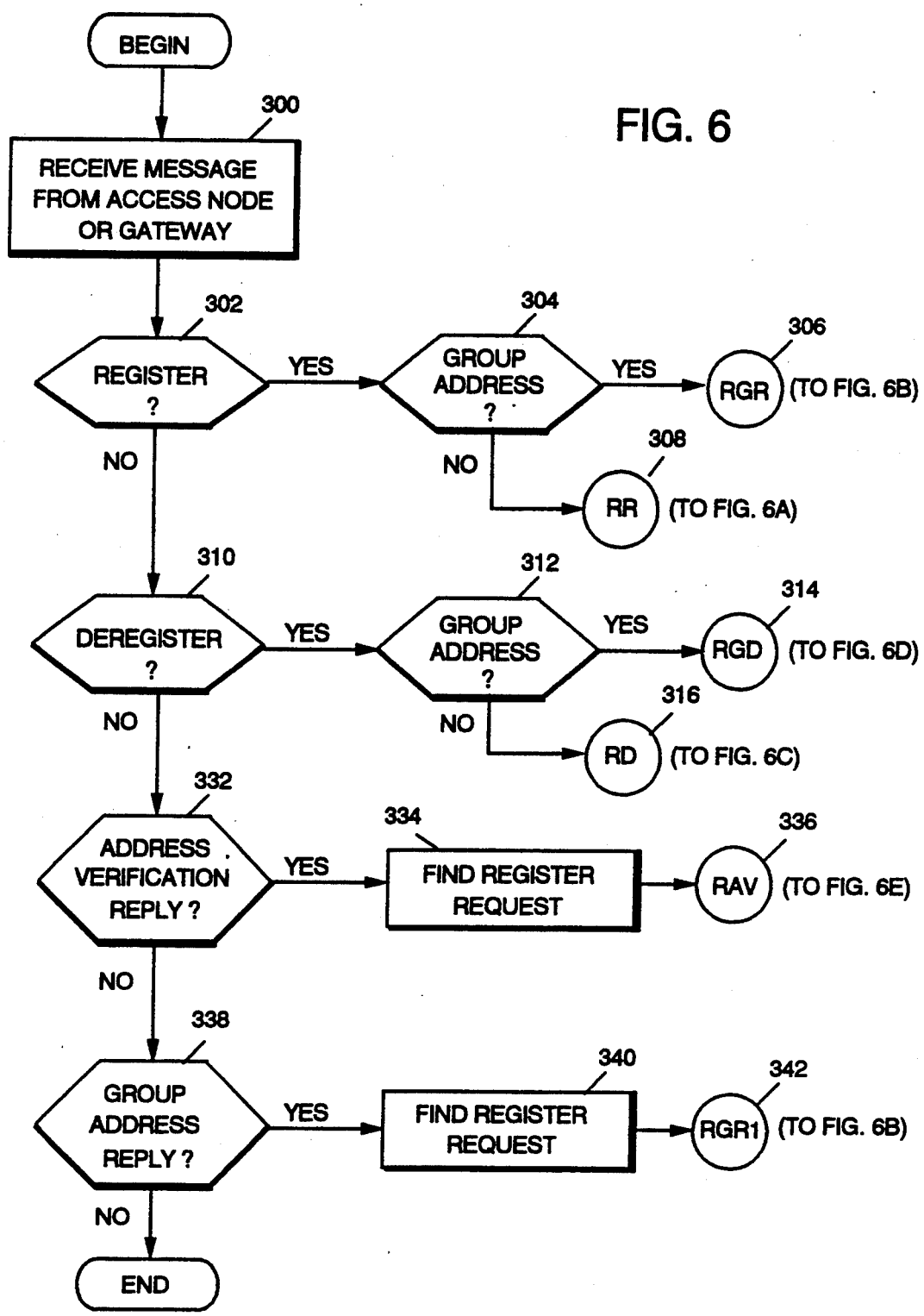
FIG. 6 is another high level flow diagram showing the logic flow of the Address Registry responding to messages from an access node or a transport gateway during the registration/deregistration process of a user address.
Figure 6A:
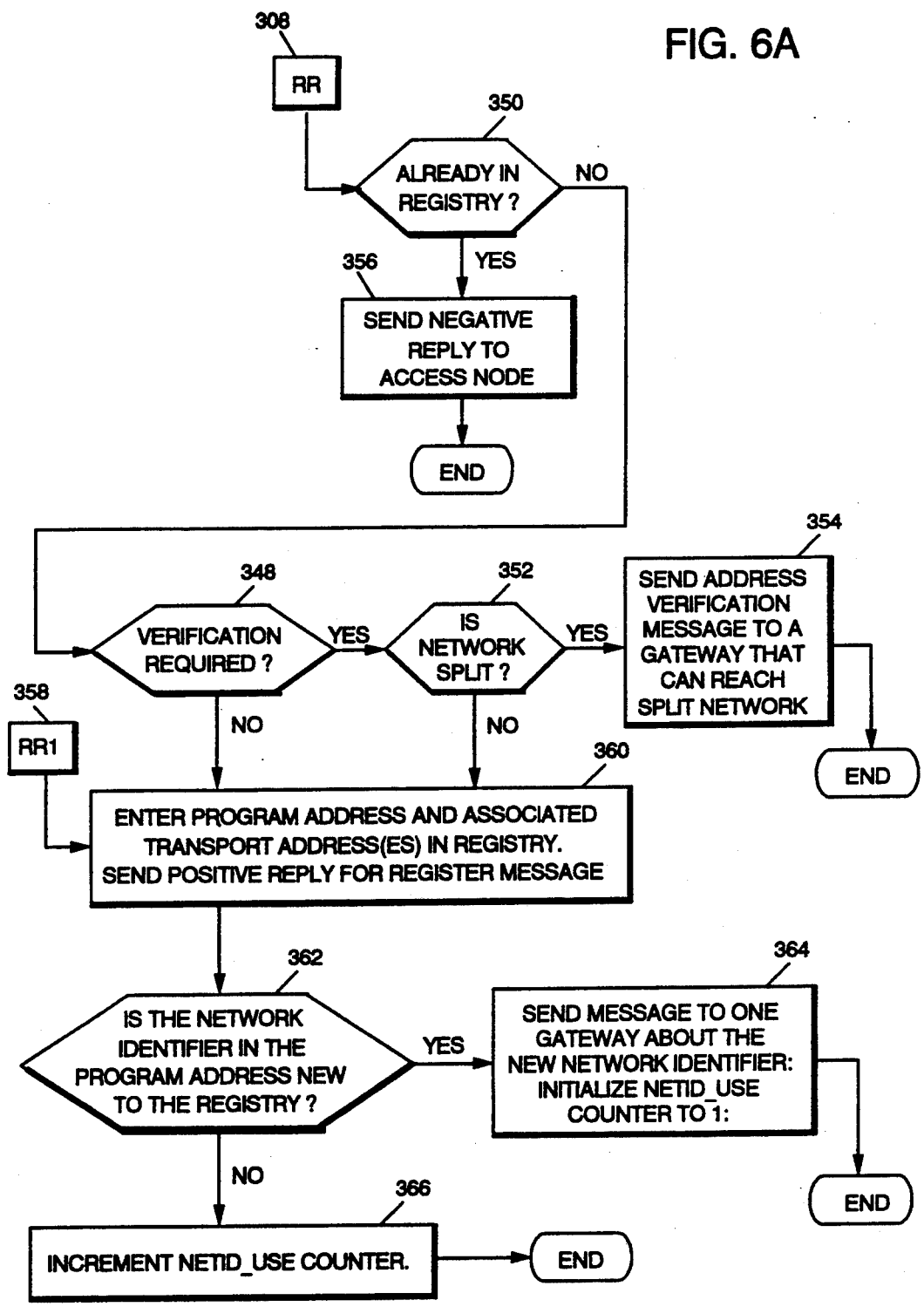
FIGS. 6A through 6E illustrate the same logic flow in greater detail.
Figure 6B:
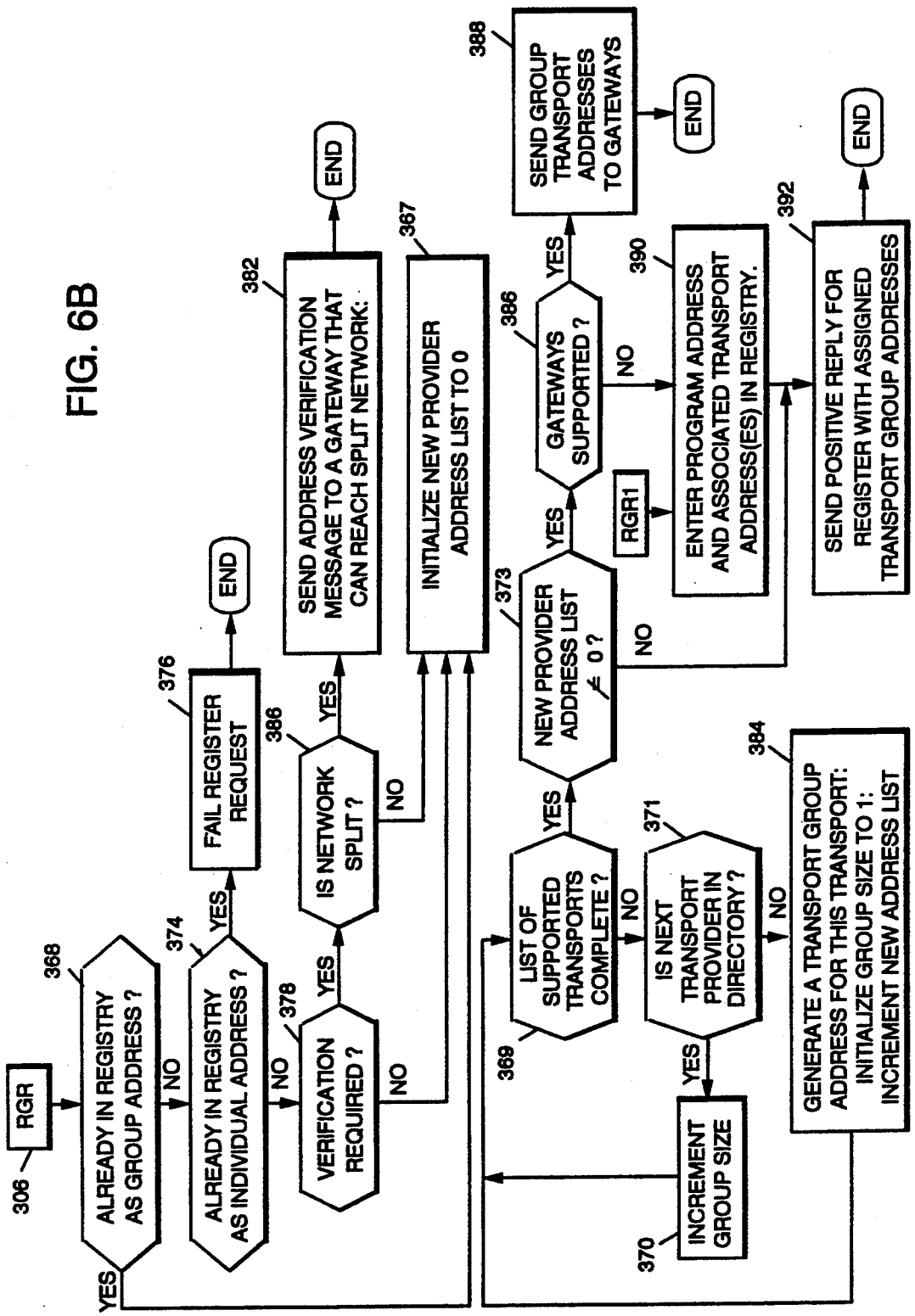

Referring now to FIG. 6, the procedure which the Address Registry utilizes for address registration/deregistration is shown at a high level. Initially, the Address Registry receives a message from the access node or a gateway at 300. If the message is a request to register from an access node at 302, the Address Registry determines whether it is a request to register a group address or an individual address at 304. If it is a group address, "RGR" 306 in FIG. 6B is invoked. If it is a request to register an individual address, "RR" 308 in FIG. 6A is invoked.

Figure 6C:
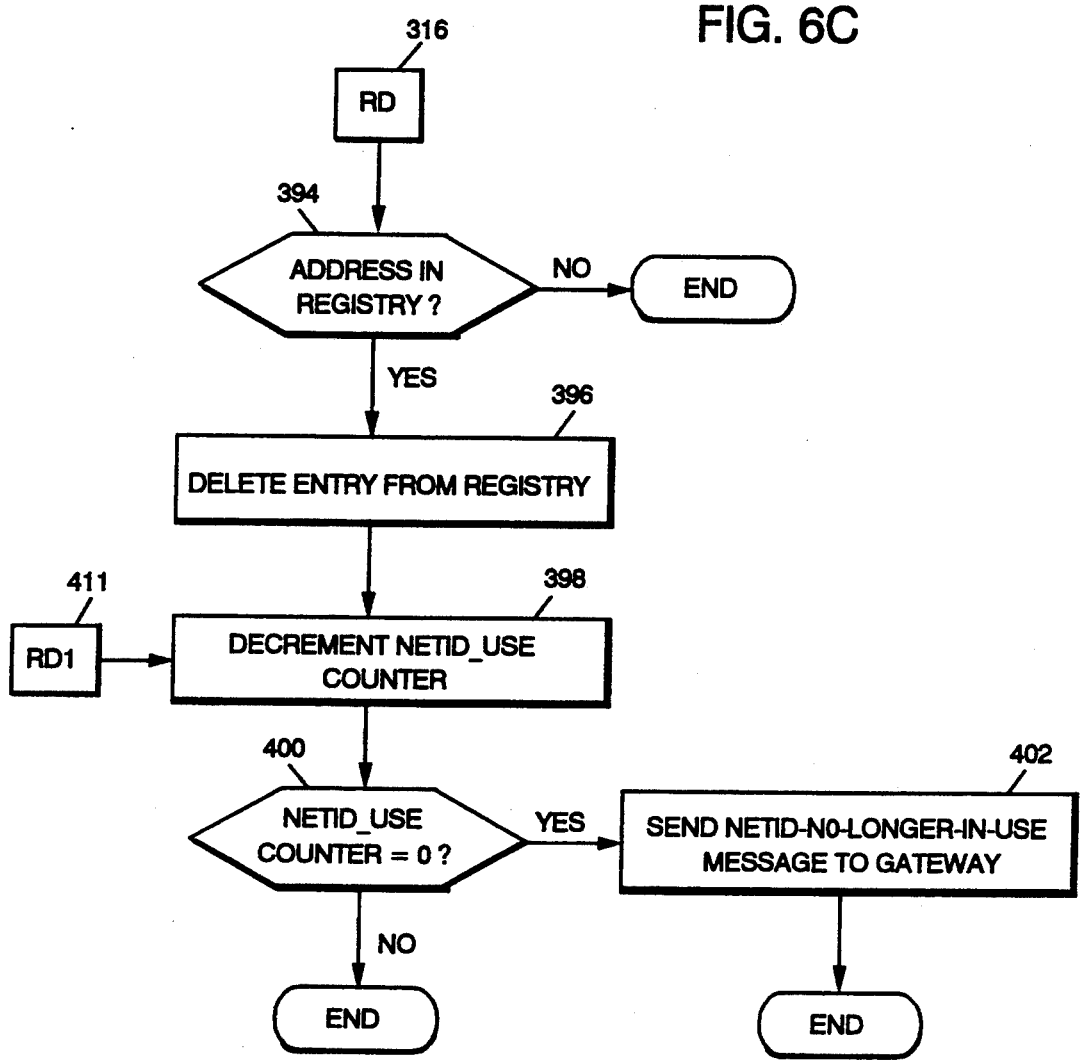
Figure 6D:
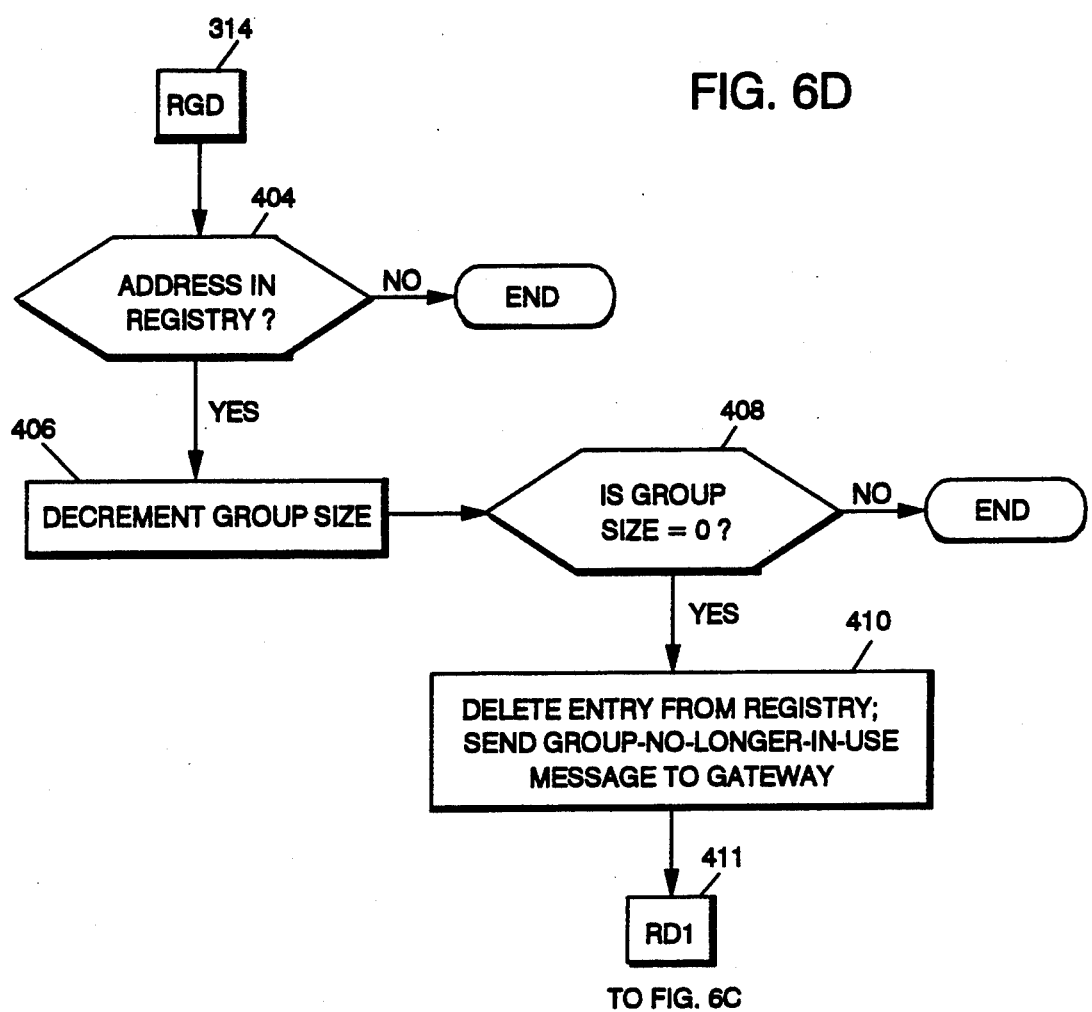

If the message is a request to deregister from an access node at 310, the Address Registry similarly determines whether the address to be deregistered is a group address, wherein "RGD" 314 shown in FIG. 6D is invoked, or an individual address wherein "RD" 316 of FIG. 6C is invoked.

Figure 6E:
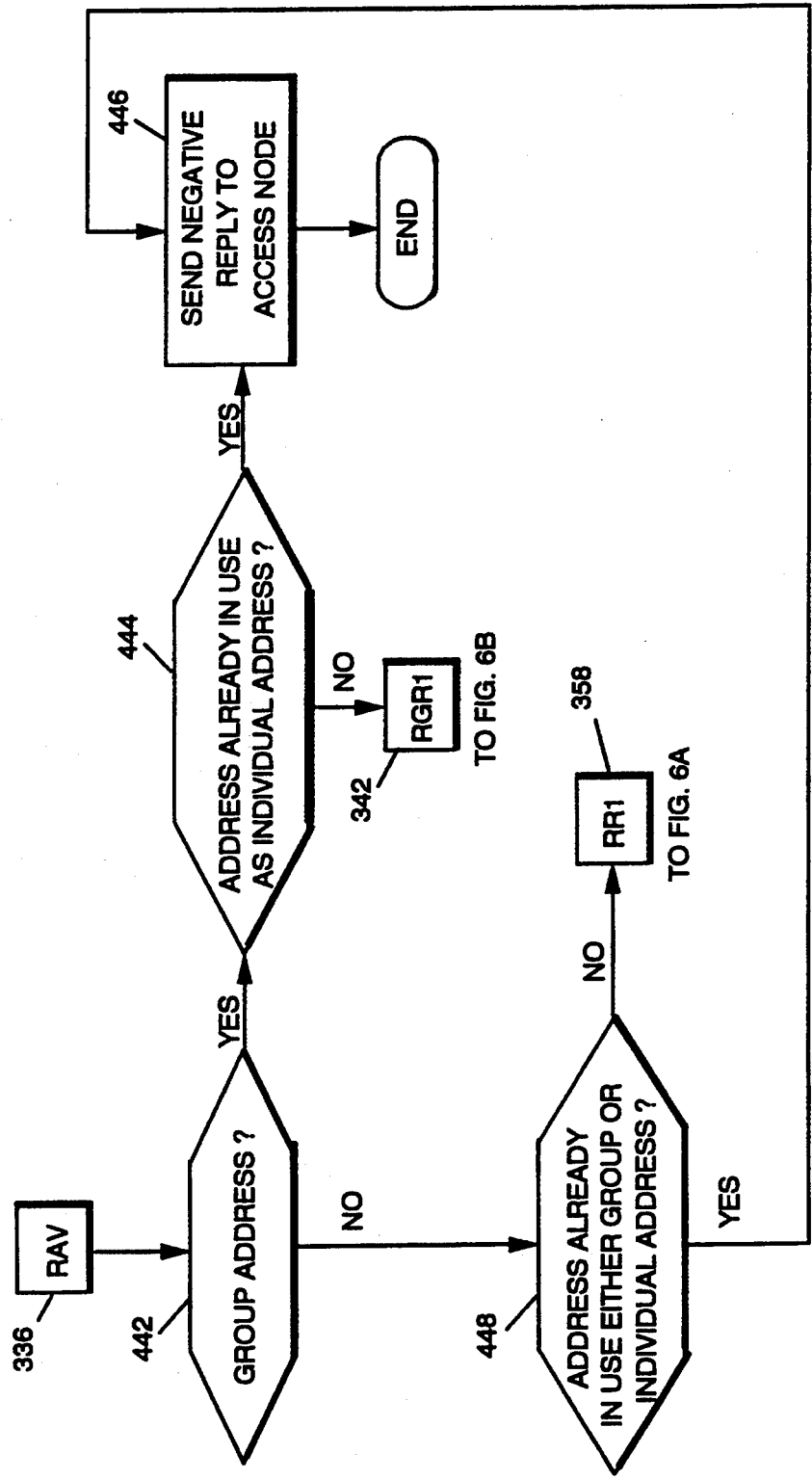

If the message is an Address Verification Reply from a gateway at 332, the Address Registry finds the register request at 334 and invokes "RAV" 336 shown in FIG. 6E.

If the message is not an Address Verification Reply from a gateway at 332 but rather a Group Address Reply at 338, the Address Registry finds the register request at 340 and invokes "RGR1" 342 shown in FIG. 6B.

Referring now to FIG. 6A, "RR" 308 is illustrated. If the address is already in the Registry at 350, the Address Registry sends a negative reply to the access node at 356 indicating that another User has registered under that address. For some protocols, such as NetBIOS, explicit verification of the address is required. If a verification is required at 348, and the network is split at 352, the Address Registry sends an address verification message to a gateway that can reach the split network at 354. Where a network is split, interconnected by one or more gateways, all portions of the network must be verified so that there is no addressing redundancies as the same network ID is used for all portions of the split network.

If the network is not split at 352 or verification is not required at 348, the Address Registry enters the program address and associated transport address or addresses in the Registry and sends a positive reply for the register message at 360. If the network identifier in the program address is new to the Registry at 362, the Address Registry sends a message to one gateway about the new network identifier and initializes the NETID USE counter to "1" at 364. If the network identifier in the program address is not new to the Registry at 362, the Address Registry increments the NETID_USE counter at 366. Because some gateways may be connected between more than two networks, each gateway must maintain which networks it is responsible for. This is done via the network ID. The NETIDUSE counter is used for keeping track of the number of active programs per network so that when there are no active programs for a particular network, the gateway may be able to deregister the network.

"RGR" 306 is illustrated in FIG. 6B. If the group address is already in the Registry as a group address at 368, the Address Registry initializes the New Provider Address List to zero at 367 and determines whether all of the supported transports for that group have been registered at 369. If not, at 371 it is determined whether the next transport Provider is in the directory. If it is, the group size is incremented at 370. If not, the Registry generates a transport group address for this transport, initializes the GroupSize to 1, and increments the NewProviderAddressList at 384. If the list of supported protocols is complete at 369, the Registry determines whether the New_Provider _AddressList is equal to zero at 373. If it is, a positive reply for the Register request with the assigned transport group addresses is sent at 392. If not, it is determined whether gateways are supported at 386. If they are, the Registry sends the transport addresses to the corresponding gateways. If they are not supported, the Registry enters the program address and associated transport address(es) in the Registry at 390 and sends a positive reply at 392 as discussed above.

If, at 368, the address is not in the Registry as a group address but it is in the Registry as an individual address at 374, a Fail Register Request is returned at 376. If the address is not in the Registry as an individual address at 374, and verification is not required at 378, the New_Provider_Address_List is initialized at 367 as discussed above. If verification is required at 378, and the network is split at 380, the Address Registry sends an address verification message to a gateway that can reach the split network at 382.

"RD" 316, the individual address deregistration procedure, is illustrated in FIG. 6C. The Address Registry checks to see if the address is in the Registry at 394. If it is, it deletes the entry from the Registry at 396, decrements the NETID_USE counter at 398, and determines whether the NETID_USE counter is equal to zero at 400. If it is, the Address Registry sends an NETID-NO-LONGER-IN-USE message to the gateway at 402 so that the gateway can remove the particular network from its own directory.

If the address to be deregistered is a group address at 314 in FIGS. 6 and 6D, and the address is in the Registry at 404, the Address Registry decrements the group size at 406 and determines whether the group size is equal to zero at 408. If it is, the Address Registry deletes the entry from the Registry and sends a GROUP-NO-LONGER-IN-USE message to the gateway at 410 so that the gateway can remove the group from its directory. It then decrements the NETIDUSE field and processes the NETID at 411 in FIG. 6C to remove the NETID if needed.

If the message is an Address Verification Reply at 332 in FIG. 6, the Address Registry finds the register request at 334, invokes "RAV" 336 shown in FIG. 6E. If the address to be verified is identified in the register request as a Group Address at 442, the Address Registry determines whether the reply indicates that the address is already in use as an individual address elsewhere in the network at 444. If it is, it sends a negative reply to the access node 446 indicating to the Local Control Function that the ID requested is already in use. If it is not, "RGR1" 342, to be discussed below, is invoked. If the address to be verified is identified as an individual address at 442, and the reply indicates that the address is already in use as either a group or individual address at 448, the Address Registry sends a negative reply to the access node at 446. If the address is not already in use at 448, "RRI" 358 shown in FIG. 6A as discussed above, is invoked.

If, in FIG. 6, the message is a Group Address Reply from a gateway at 338, the Address Register finds the Register Request at 340 and invokes "RGR1" at 342 (FIG. 6B). At 390, the Address Register enters the group address and associated transport address(es) in the Registry.

Establishment of Connection/Conveyance of Datagram

Figure 7:
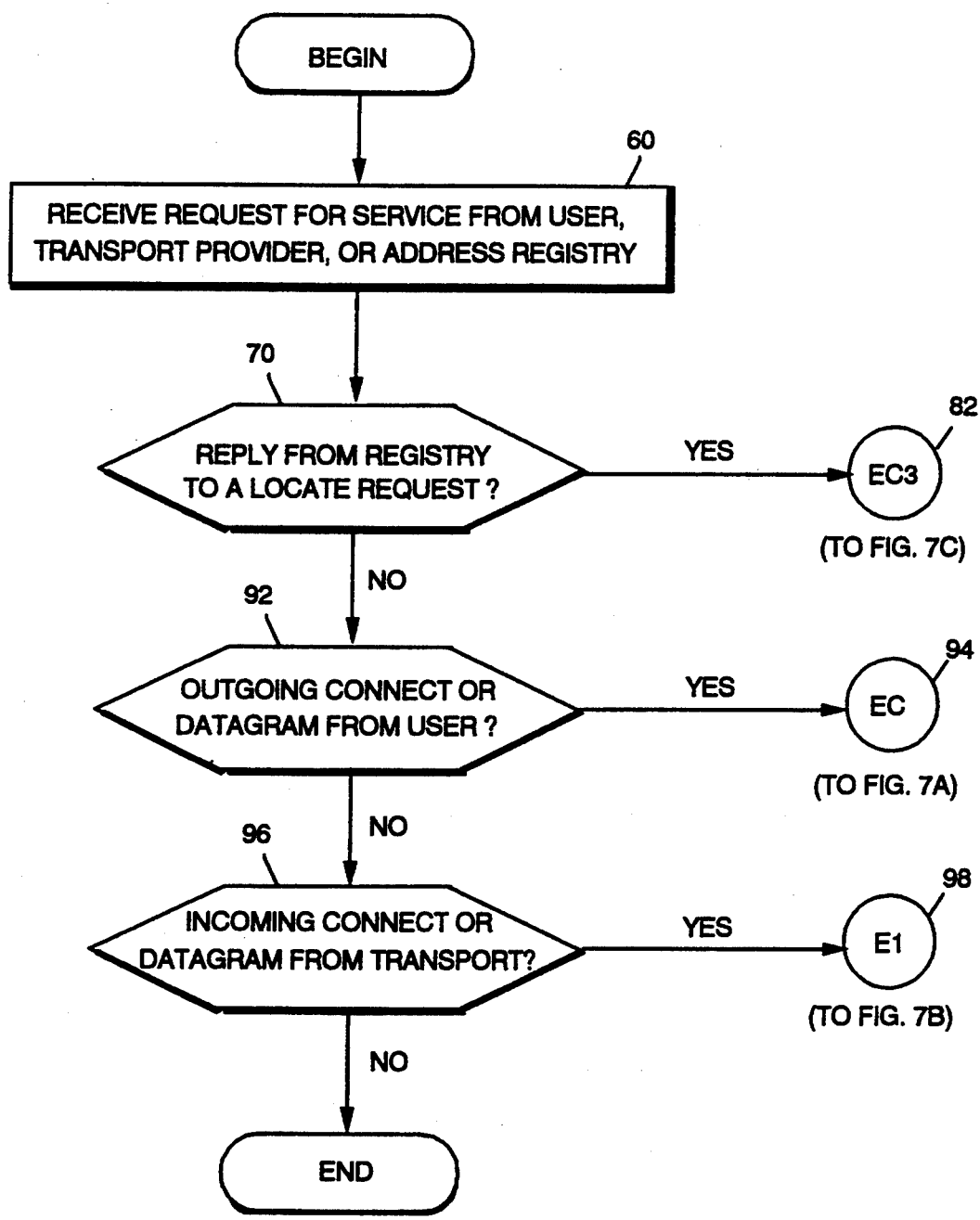
FIG. 7 is a high level flow diagram showing the logic flow of the Local Control Function in an MPTN access node during the establishment of a connection or the conveyance of a datagram between two program partners.
Figure 8:
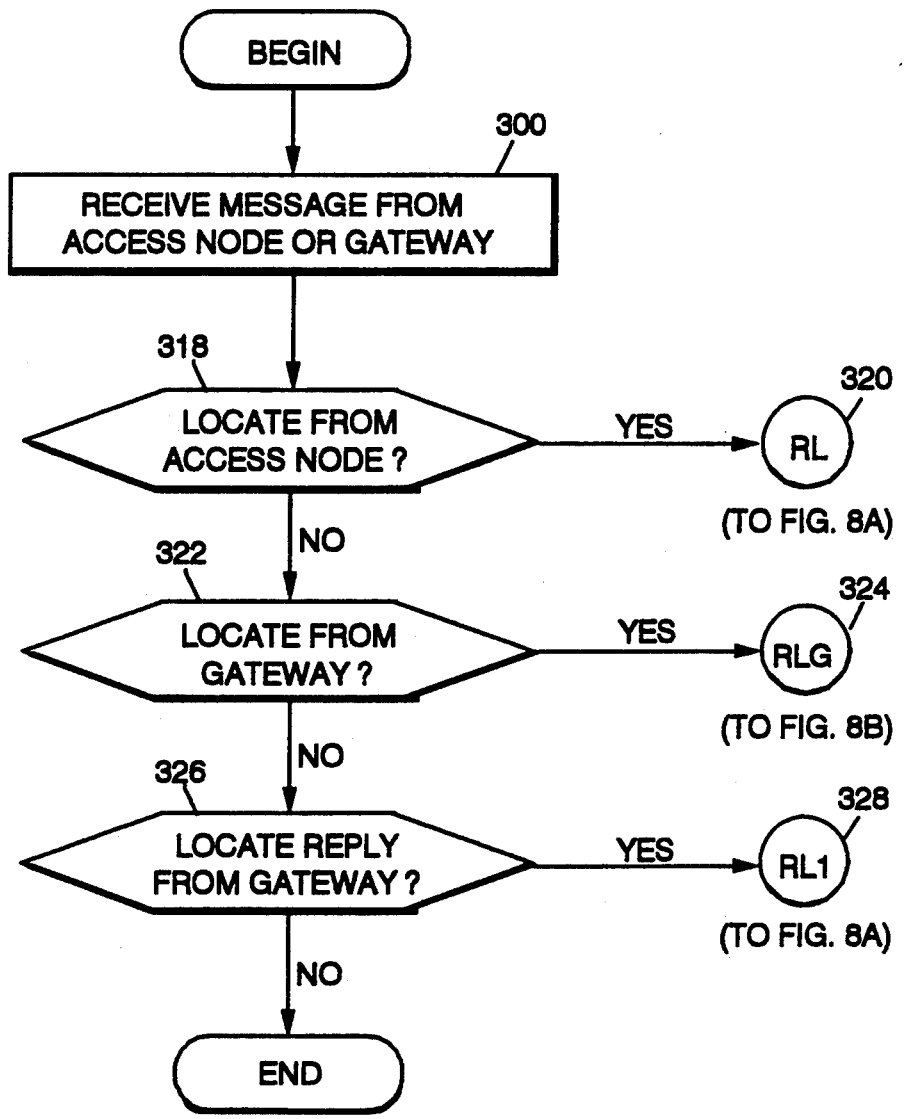
FIG. 8 is a high level flow diagram showing the logic flow of the Address Registry during the establishment of a connection or the conveyance of a datagram between two program partners.
Figure 8A:
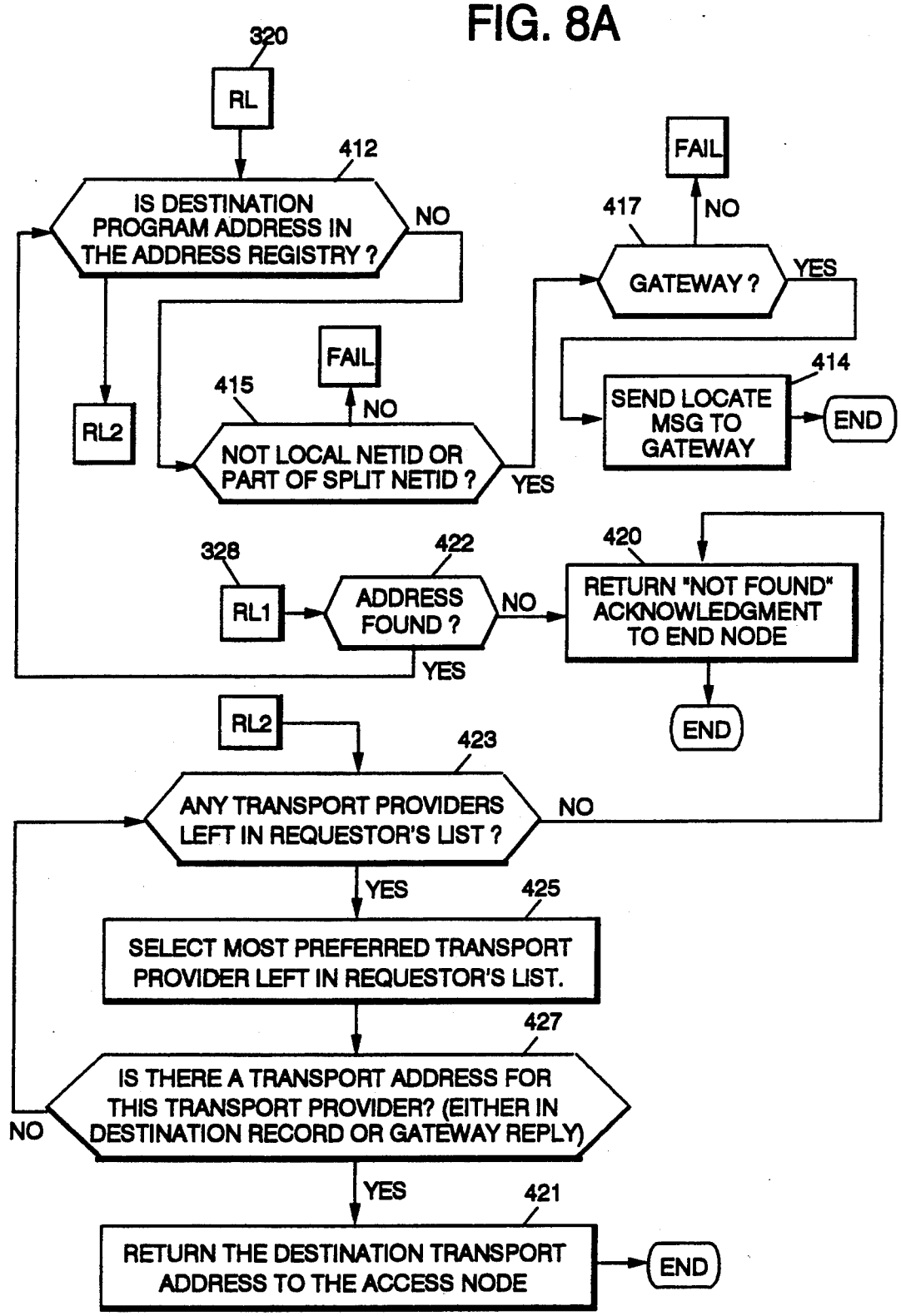
FIGS. 8A and 8B illustrate the same logic flow in greater detail.
Figure 8B:
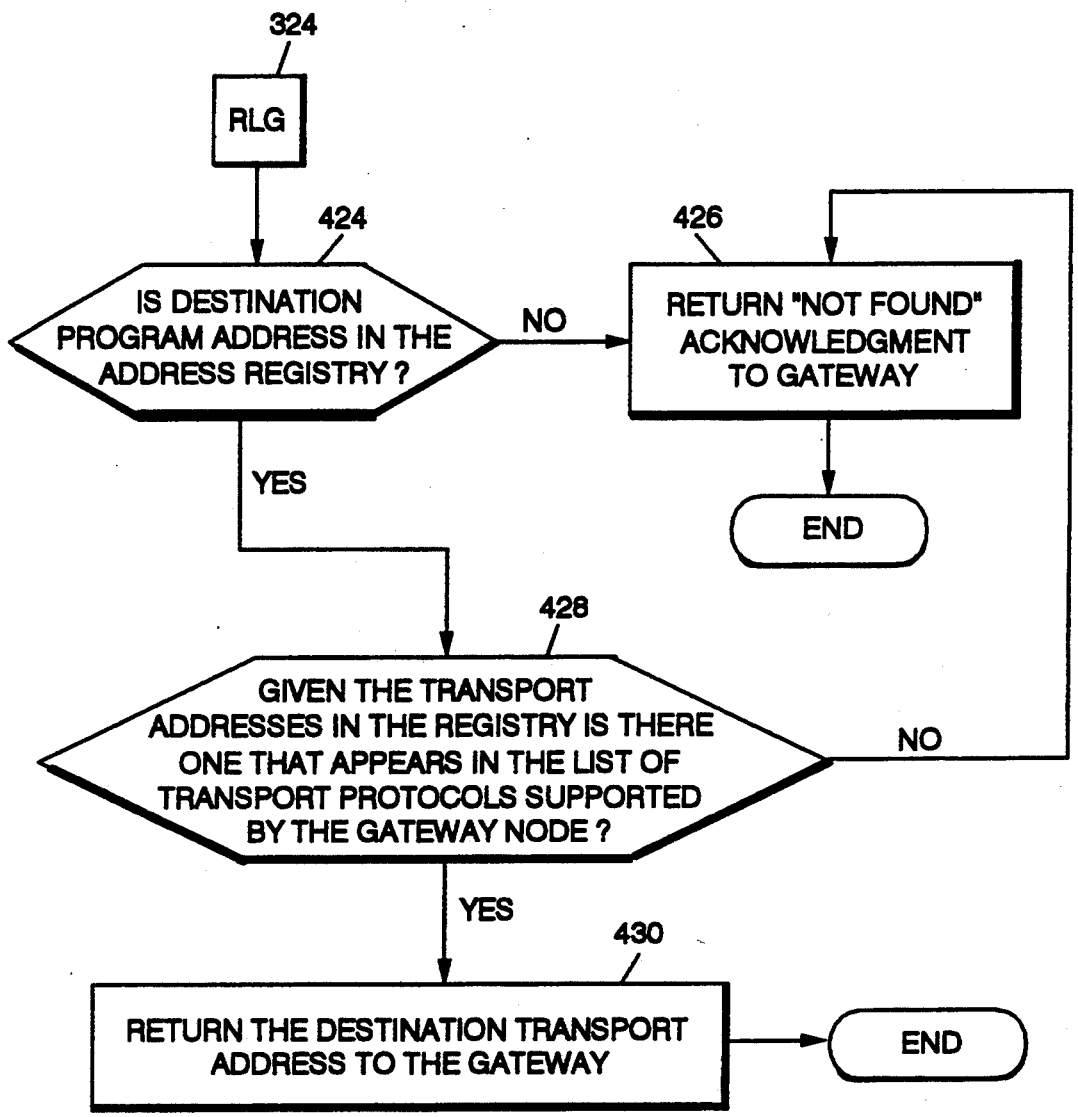

FIGS. 7 and 8 illustrate the high level logic corresponding with the establishment of a connection and the conveyance of a datagram between partner programs. FIG. 7 corresponds to the logic within the Local Control Function while FIG. 8 corresponds to the logic within the Address Registry.

Figure 7B:
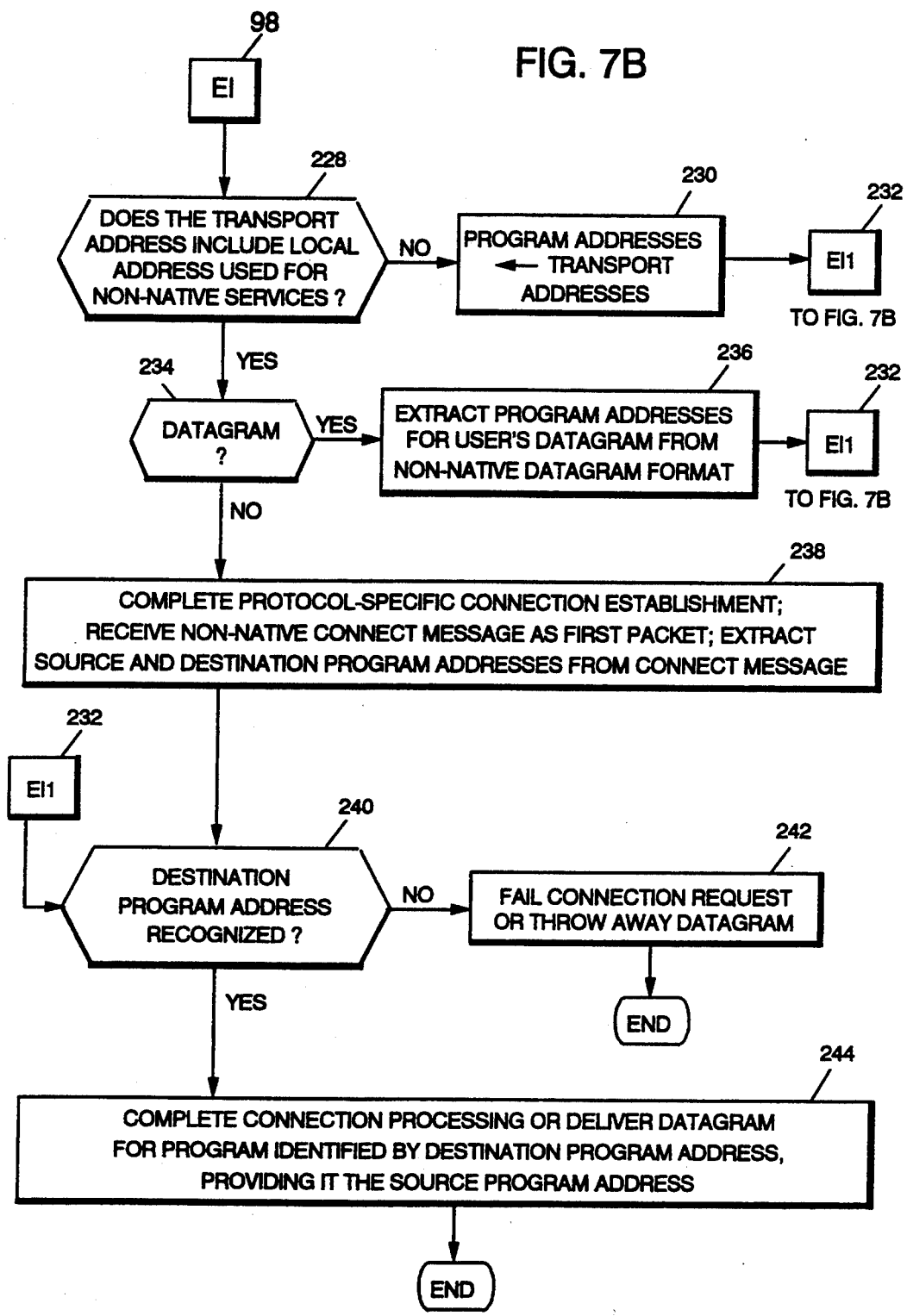

As shown in FIG. 7, if the request for service is an outgoing connect or datagram from a User at 92, "EC" process at 94 is invoked (FIG. 7A). If the request for service is an incoming connect or datagram from a transport at 96, "EI" is invoked at 98 (FIG. 7B).

Figure 7C:
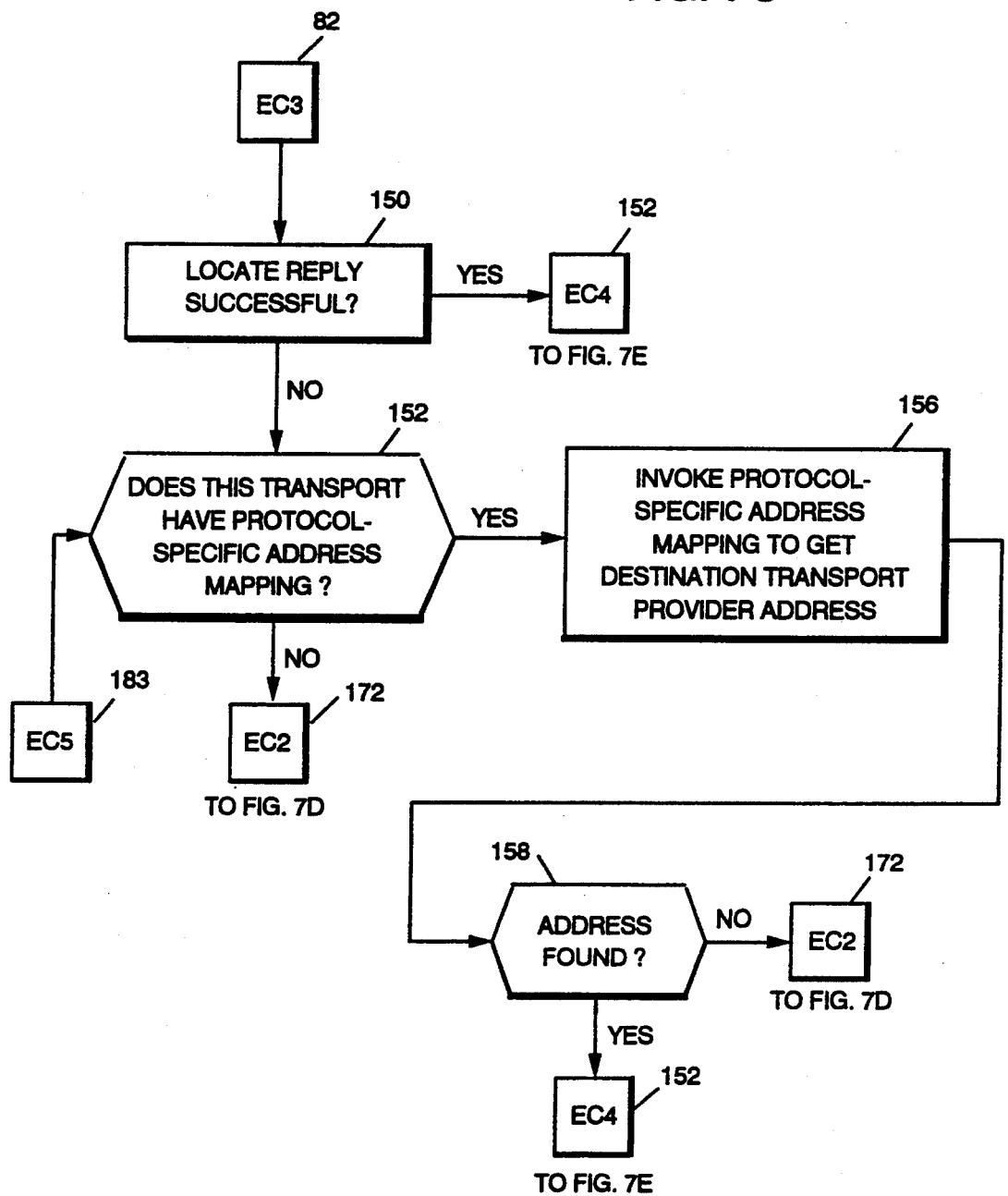

If the request is a reply to a Locate request from the Registry at 70, the Local Control Function invokes "EC3" at 82 (FIG. 7C). The Local Control Function determines whether the Locate was successful at 150. (A "Locate" command is used by the Local Control Function when it needs to locate a partner program so that a connection may be made or a diagram sent therebetween.) If it was, process "EC4" 152 of FIG. 7E is invoked. This will be discussed in greater detail below. If it was unsuccessful, the Local Control Function determines, at 154, whether the transport has protocol-specific mapping, i.e., algorithmic or native directory. If it does, at 156, the Local Control Function invokes the protocol-specific address mapping to get destination node address. If it does not, "EC2" 172 of FIG. 7D (to be discussed in greater detail) is invoked wherein other transports, if any, are tried. Likewise, if the address is not found at 158, "EC2" 172 in FIG. 7D is invoked.

If the destination address is found, "EC4" 152 in FIG. 7E is invoked. At "EC4" 152, the Local Control Function converts the node-level transport (User) address to a complete transport address by adding the "well-known local ID" for non-native services at 162. The well-known local ID is a unique ID used by the MPTN to indicate to another MPTN access node that MPTN is being used. The well-known local ID is understood by the Provider and used to do local routing at the destination. Particular messages, and the respective message formats, will be discussed below.

If a datagram at 164 is to be sent, the Local Control Function builds an MPTN datagram that carries program addresses and sends the datagram using the selected transport protocol and derived transport address at 166. If it is not a datagram, i.e., it is a connection, the Local Control Function uses the derived destination transport address to open a connection for the selected transport at 168. If the connection setup is not successful at 170, "EC2" 172, discussed below, is invoked. If it is successful, the Local Control Function sends the MPTN Connect message with the application addresses as the first message on the connection and receives the MPTN Connect reply at 174. This message is data to the provider. If the MPTN Connect reply is positive at 176, the process is complete. If not, "EC2" 172 is invoked.

Figure 7D:
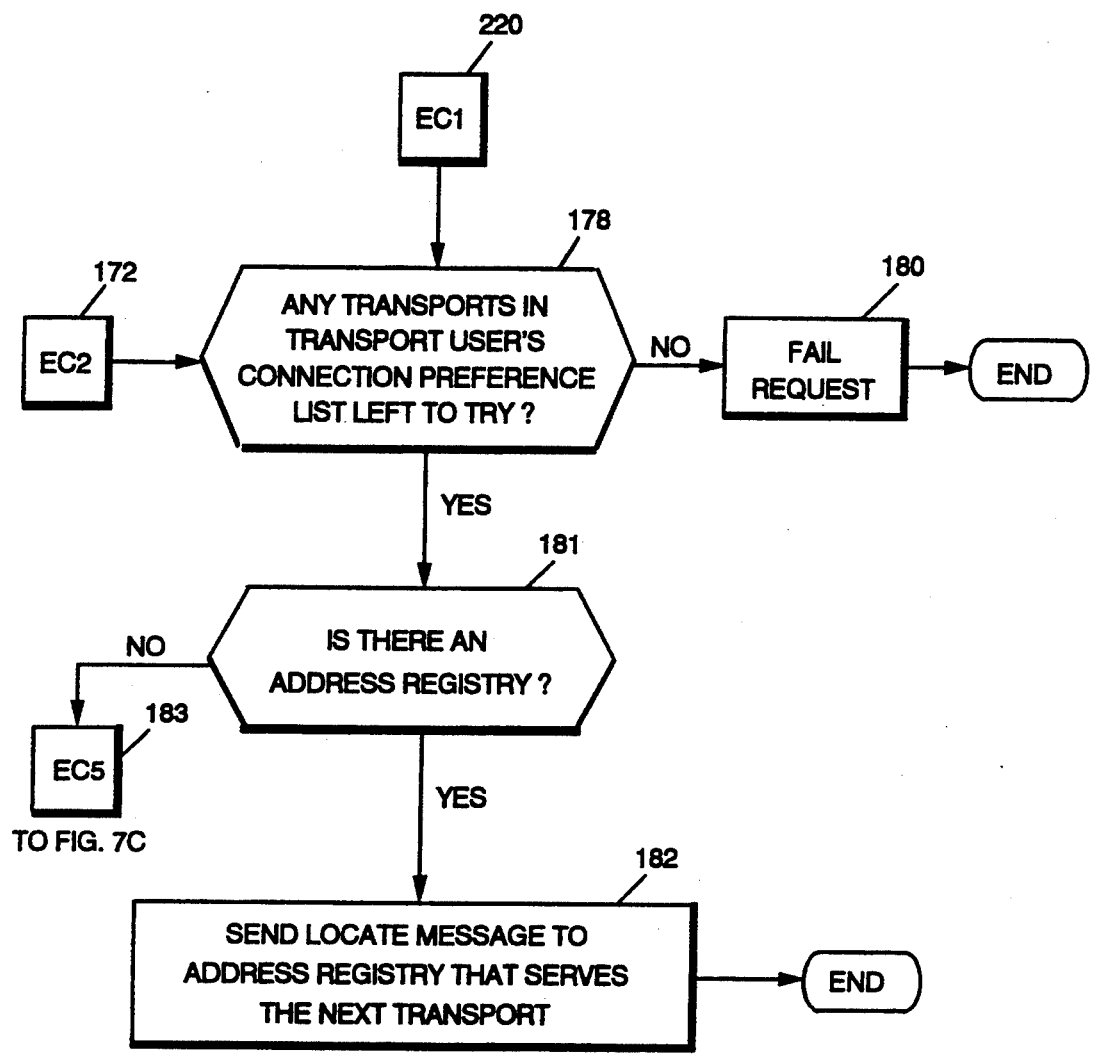
Figure 7E:
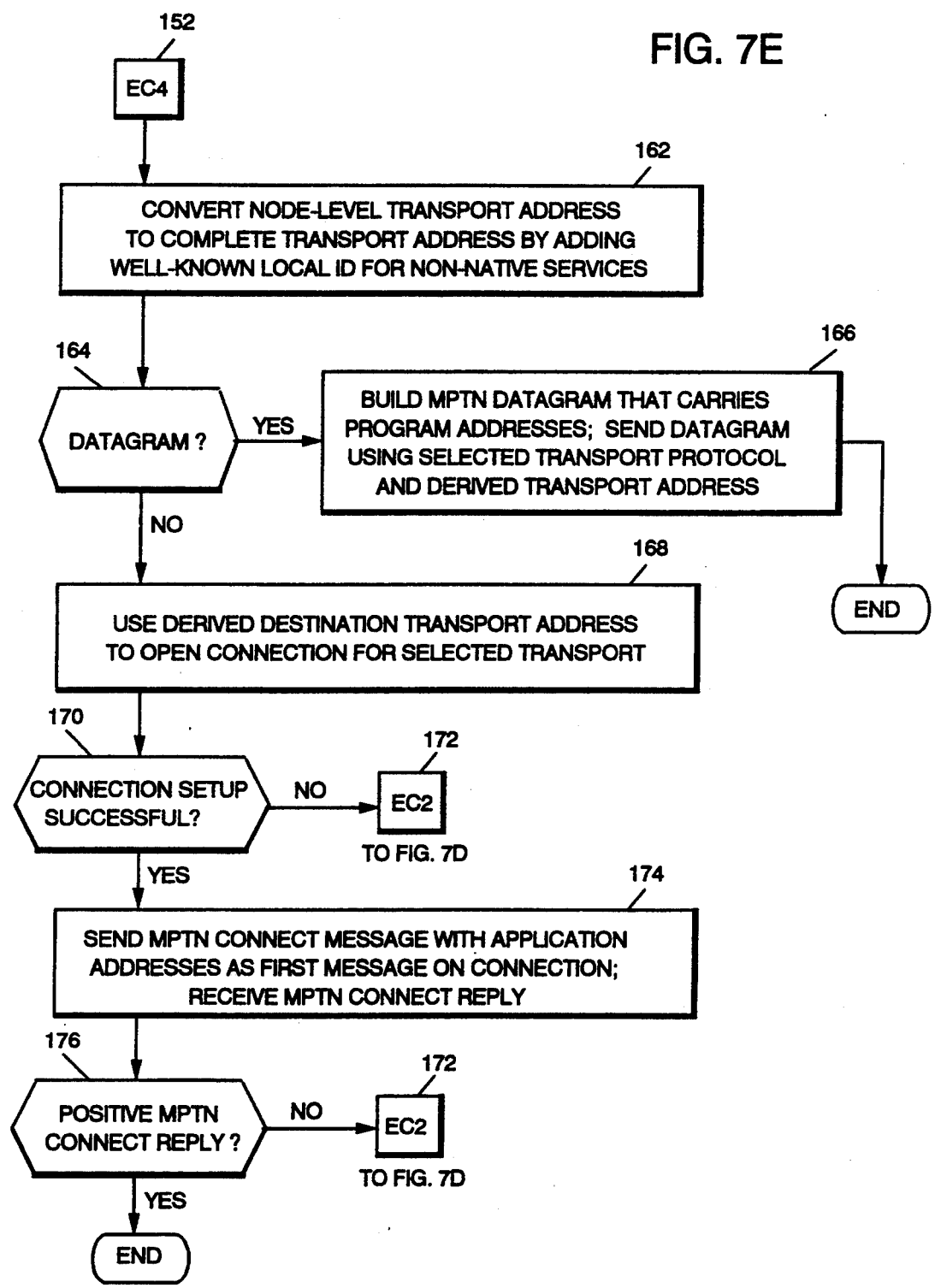

"EC2" 172 is shown in FIG. 7D. The Local Control Function determines whether there are any transports in the transport User's connection preference list left to try at 178. If not, Local Control Function "fails" the request at 180. If so, the Local Control Function determines, at 181, whether there is an Address Registry (sometimes an Address Registry is not used). If there is no Address Registry available, "EC5" 183 of FIG. 7C as discussed above is invoked. If an Address Registry that serves the next transport is available, the Local Control Function sends a Locate message at 182.

Referring again to FIG. 7, if the request for service is an outgoing connect or datagram from a User program at 92, "EC" at FIG. 7A is invoked to determine whether native services can be used. If the source address and the destination address do not have matching address types at 218, "EC1" 220 of FIG. 7C is invoked as discussed above. If they do, the Local Control Function determines whether there is a transport available that uses the same address type as the source address at 222 and, if not, "EC1" 220 is invoked. If so, the Local Control Function determines whether the program uses transport features that require MPTN headers to be inserted in the data stream if run over this transport at 224. If so, "EC1" 220 is invoked. If not, the program address is used as a transport address and the protocol-specific connection or datagram protocol is used at 226.

If the request for service is an incoming Connect message or datagram from the transport at 96 in FIG. 7, "EI" 98 in FIG. 7B is invoked. If the transport address does not include the local address used for non-native services at 228, i.e., if the transport address does not include the well-known local ID used for MPTN communication only, the program is native to the Provider and program addresses are set to be the transport addresses at 230 and "E11" 232 is invoked. "E11" 232 is the portion of the procedure where the destination address is examined for recognition to be discussed below. Local control function determines whether it is a datagram at 234. If it is, the program addresses are extracted from the non-native datagram format for the User's datagram at 236 and "E11" 232 is invoked. If it is not a datagram, the protocol-specific establishment is completed, the non-native Connect message is received as the first packet, and the source and destination program addresses are extracted from the Connect message at 238. At 240 (or "E11" at 232), the destination program address is examined for recognition. If it is not recognized, the connection request is failed or the datagram is thrown away at 242. If it is recognized, at 244, the connection processing is completed or the diagram is delivered to the program identified by the destination program address, providing it with the source program address so that it knows where it came from.

Referring now to FIG. 8, the logic used by the Address Registry for setting up a connection or sending a datagram is shown. Initially, a message is received from an access node or gateway at 300. If the message is a Locate request from an access node at 318, "RL" 320 shown in FIG. 8A is invoked. If the message is a Locate request from a gateway at 322, "RLG" 324 of FIG. 8B is invoked. If the Address Registry determines that it is a Locate reply from a gateway at 326 in FIG. 8, "RL1" 328 shown in FIG. 8A is invoked.

If, in FIG. 8A, the destination program address is not registered in the Address Registry at 412, the Address Registry determines whether the network is part of a split network or whether the Net_Id identifies a non-local network at 413. If not, a "fail" response is returned. If so, the Address Registry determines whether there is a gateway at 415. If not, a "fail" response is returned. If so, the Registry determines, at 417, whether there is a gateway and, if so, sends a Locate message to the gateway at 414 for determining whether the destination program address may be located in other networks or in the other portion of the split network. If the destination program address is registered in the Address Registry at 412, the Address Registry determines at 423 and 425 the most preferred Provider remaining in the source transport User's Preference connection list. At 427, the Address Registry determines whether the destination transport User is supported by this Provider. If so, the destination transport address is returned to the access node at 421. If not, the Address Registry determines whether there are any transport Providers remaining in the source transport User's preference list at 423. If not, a "Not Found" acknowledgement is returned to the end node at 420.

If, at 322 in FIG. 8, the message is a Locate message from a gateway, "RLG" 324 in FIG. 8B is invoked. If, in FIG. 8B, the destination program address is not registered in the Address Registry, a "Not Found" acknowledgement is returned to the gateway at 426. If it is found, the Address Registry determines whether there is a transport address in the Registry that appears in the list of transport protocols supported by the gateway node at 428. If not, a "Not Found" acknowledgement is returned to the gateway at 426. If so, the destination transport address is returned to the gateway at 430.

If, at 326 in FIG. 8, the Address Registry determines that it is a Locate reply from a gateway, "RLl" 328 of FIG. 8A is invoked. If the address cannot be found by the Address Registry at 422, the Address Registry returns a "Not Found" acknowledgement to the end node at 420 as discussed above. If it is found, the Address Registry determines whether it is the transport address in the Registry or returned by the gateway that appears in a list of transport protocols supported by the source end node at 412 as discussed above.

MPTN Message/Command Formats

Figure 9:
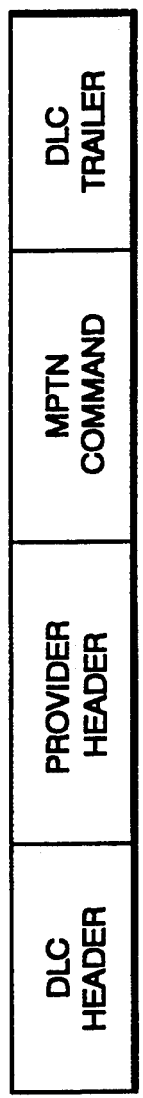
FIG. 9 illustrates the basic format of an MPTN message of the present invention.

FIGS. 9 through 19 are graphical representations of the particular message formats for messages exchanged in an MPTN. FIG. 9 shows a basic link unit (BLU) format which is routed throughout a computing network, between MPTN Access Nodes, MPTN Address Registries and MPTN Gateways. The BLU includes a Data Link Control (DLC) header and trailer for formatting as is well known in the art. An example of a format is Synchronous Data Link Control (SDLC). The BLU also includes a Provider header for the particular transport Provider being utilized and the MPTN command, or message, (i.e., Register, Connect, or Locate). DLC and Provider message formatting is well known in the art and will not be described here.

During message exchange through the between the MPTN network components, the DLC header and trailer is stripped away by the particular protocol being used, and, similarly, the Provider header is stripped off by the transport Provider.

Figure 10:
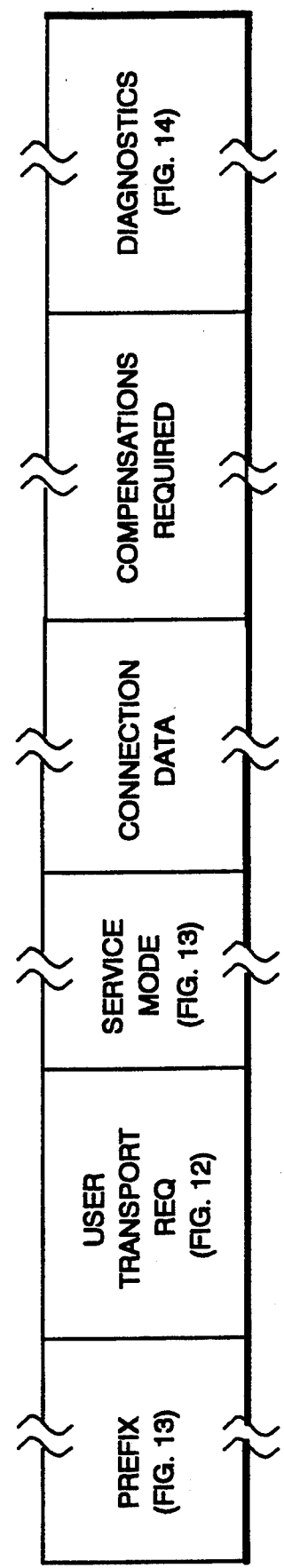
FIG. 10 illustrates the format of an MPTN Connect message of the present invention.

FIG. 10 illustrates the MPTN command format for a stream Provider, such as TCP/IP. This format consists of a five-byte field representing the overall command length followed by a variable length field representing the actual MPTN command. The MPTN command format for record transport Providers, e.g., SNA, OSI and NetBIOS, has only the MPTN command and not the command length field.

There are several commands which will be described: Connect, Register and Locate (and associated Disconnect and Deregister). FIG. 10 shows the command format for the Connect command. This format is used for the Connect request, as well as the positive and negative replies. The Connect command format consists of six required fields: (1) a prefix field (FIG. 11), which is a standard prefix used for all MPTN commands; (2) a User transport request field (FIG. 12), which is a set of transport characteristics requested by the transport User; (3) a service mode field (FIG. 13), which represents the level of transport search required; (4) a User connection data field, which represents transport User connection data (for example, an SNA transport User may send a BIND image to a destination transport User); (5) a compensation required field, which represents the types of compensation that will be used on this connection (this is discussed in greater detail in commonly assigned, co-pending patent application Ser. No. 07/731,564); and (6) a diagnostics field (FIG. 14), which represents the reason for failure on a negative reply. The first two fields, the prefix and User transport request fields, are required fields, while the remaining four fields are optional. Additional optional fields can be added by Gateways.

Figure 11:
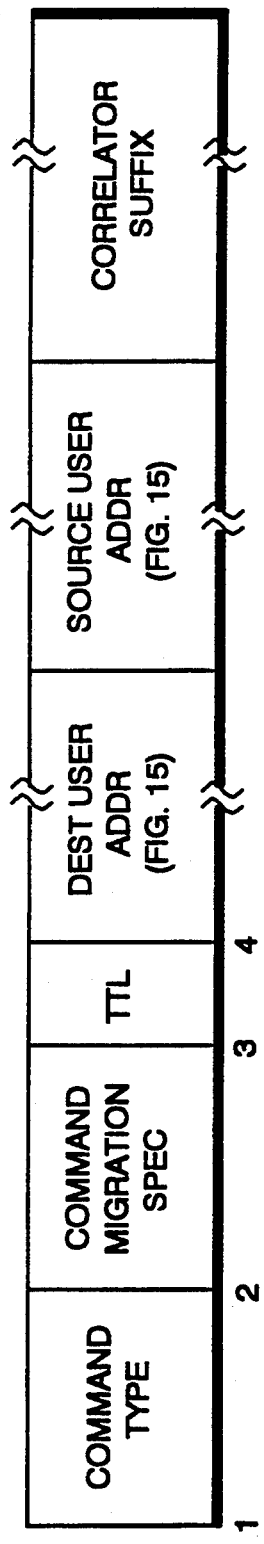
FIG. 11 illustrates the format of the prefix field of an MPTN message of the present invention.

Referring now to FIG. 11, the format for the prefix field as illustrated in FIG. 10 is shown. The prefix field consists of six individual fields: (1) a single byte command type field representing the type of command format; (2) a single byte command migration specification field representing instructions to the destination transport User about how to handle if the command type if unknown; (3) a single byte TTL field for use by Gateways to prevent indefinite looping; (4) a destination transport User address field, a variable length field representing the destination transport User address; (5) a source transport User address field, a variable length field representing the source transport User address; and (6) a correlator suffix field which is a unique identifier for this connection.

Figure 12:
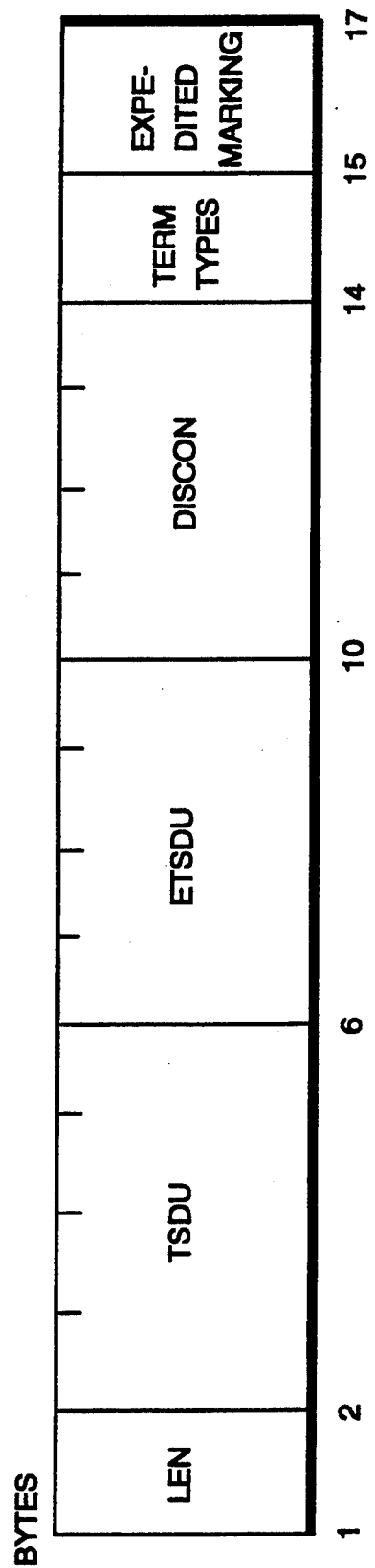
FIG. 12 illustrates the format of the User Transport Req field of an MPTN message of the present invention.

FIG. 12 illustrates the User transport request field as illustrated in FIG. 10. The User transport request field consists of six fields: (1) a single byte LEN field which represents the length of the User transport request, including the length field; (2) a TSDU field, which represents the maximum record size (this four byte field is equal to zero for a stream Provider); (3) an ETSDU field, a four byte field representing the maximum expedited message (this field is equal to zero if expedited communication is not used); (4) a DISCON field, a four byte field representing the maximum size of the termination data, e.g., UNBIND for an SNA transport Provider (this four byte field is equal to zero if termination data is not used); (5) a termination types field representing the types of termination used (this is discussed in commonly assigned, co-pending patent application Ser. No. 07/731,564); and (6) an expedited marking field as discussed in co-pending patent application Ser. No. 07/731,564.

Figure 13:
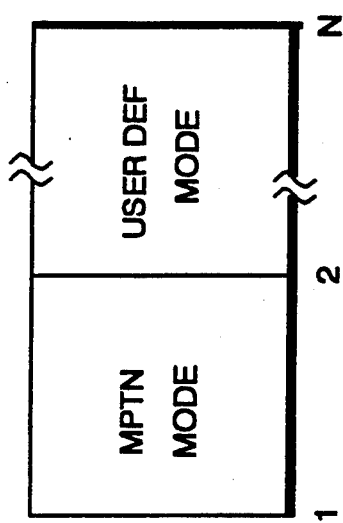
FIG. 13 illustrates the format of the Service Mode field of an MPTN message of the present invention.

FIG. 13 illustrates the service mode field of the Connect command illustrated in FIG. 10. The service mode field includes two fields: (1) an MPTN mode field representing the standard MPTN service mode to use if the User defined mode is not given or not understood (for example, by Gateway); and (2) a User defined mode field of a variable length representing a User defined service mode.

Figure 14:
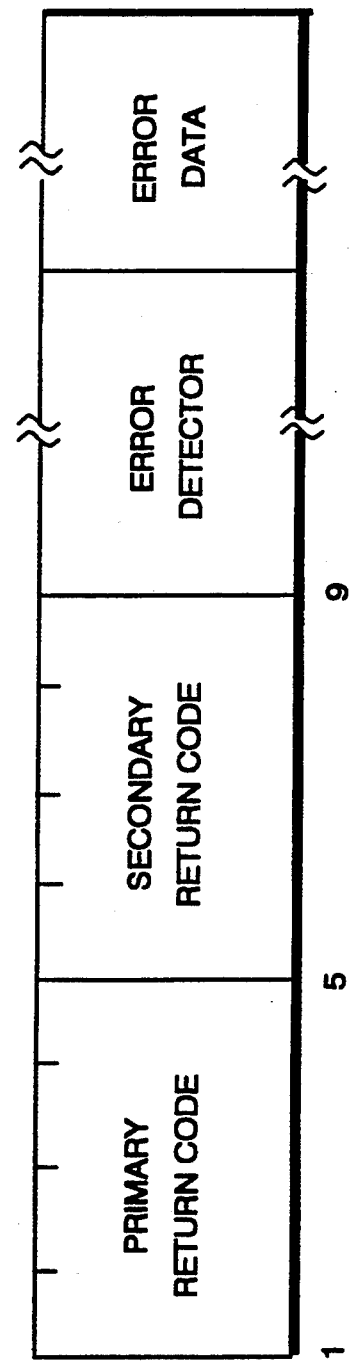
FIG. 14 illustrates the format of the Diagnostics Data field of an MPTN message of the present invention.

FIG. 14 illustrates the diagnostics data field of the Connect command as illustrated in FIG. 10. The diagnostics data field, which is only used for negative replies indicating some sort of error, consists of four fields: (1) a four-byte primary return code field indicating a general failure category; (2) a four-byte secondary return code field representing a more detailed classification of a failure; (3) an error detector field of variable length representing the address of the component detecting or generating the error; and (4) an error data field of variable length describing the error in more detail.

Figure 15:
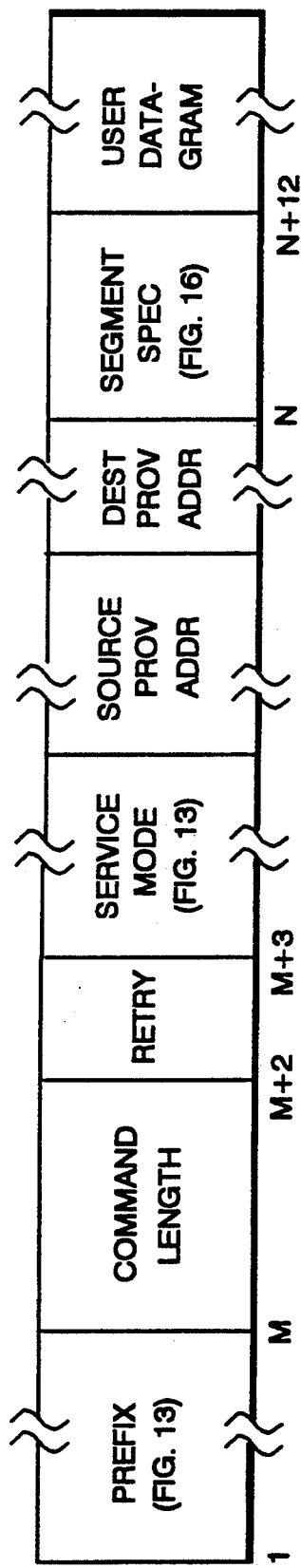
FIG. 15 illustrates the format of an MPTN Datagram message of the present invention.

FIG. 15 illustrates an MPTN datagrammessage format. The MPTN datagram format consists of eight fields: (1) a variable length prefix field which is shown in FIG. 12 and described in detail above; (2) a two byte command length field representing the length of the MPTN datagram header; (3) a single byte retry field which indicates whether Gateways should use their caches for routing this datagram; (4) a variable length service mode field shown and described above in FIG. 13 and corresponding text; (5) a source Provider address field, representing the non-standard address that the source transport Provider wants to use to receive datagrams; (6) a variable length destination Provider address, a non-standard address that the destination transport Provider want to use to receive datagrams; (7) a twelve byte segment spec field (FIG. 16) which is used by the destination local control function to reassemble the datagram segments (if the datagram is segmented); (8) a variable length User datagram, a binary string representing the actual User datagram. Of these eight fields, the service mode field, the source Provider address field, the destination Provider address field, and the segment spec field are optional fields.

Figure 16:
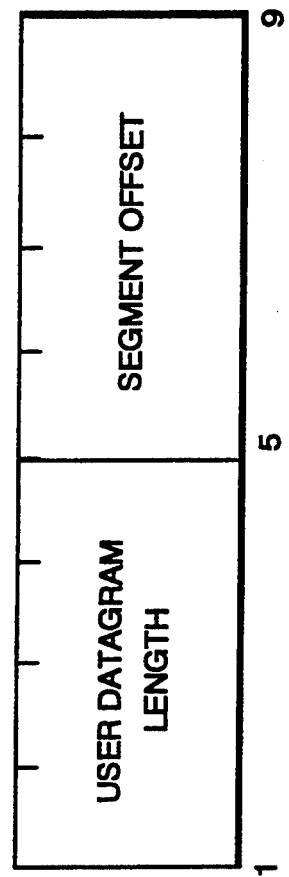
FIG. 16 illustrates the format of the Segment Spec Data field of an MPTN message of the present invention.

FIG. 16 illustrates the segment spec field of the MPTN datagram format of FIG. 15. The segment spec field consists of a four byte User datagram length field representing the length of the entire datagram, and a four byte segment offset field representing the position of this segment in the datagram so that the destination local control function can properly reposition the segmented datagram.

Figure 17:
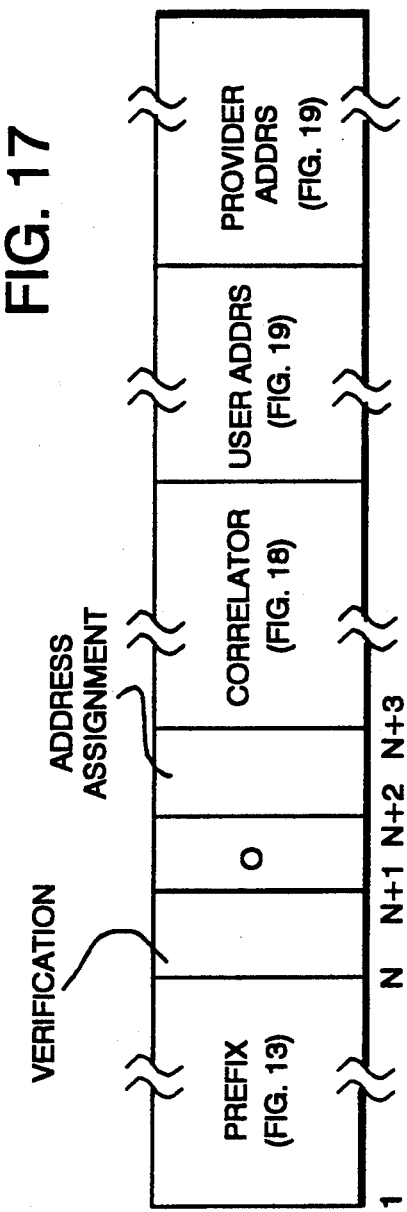
FIG. 17 illustrates the format of an EA Register message of the present invention.

FIG. 17 illustrates the Register command when sent from an Access Node to an Address Registry. This Register command is denoted as "EA-Register" to distinguish from other Register commands. The EA-Register command comprises seven fields: (1) a variable length prefix field (FIG. 11), which, as discussed above, is a standard prefix used for all MPTN commands; (2) a single-byte verification field for those transport Providers (i.e., NetBIOS) which require verification; (3) a single-byte open field for later use; (4) a single-byte address assignment field for representing whether the User address are group addresses that require transport addresses to be returned; (5) a variable length correlator field (FIG. 18) which is a unique identifier that connects all related address management commands; (6) a variable length User address field (FIG. 19) for representing the transport User addresses to be registered; and (7) a variable length Provider address field representing the transport Provider addresses that the User addresses are to be mapped to.

Figure 18:
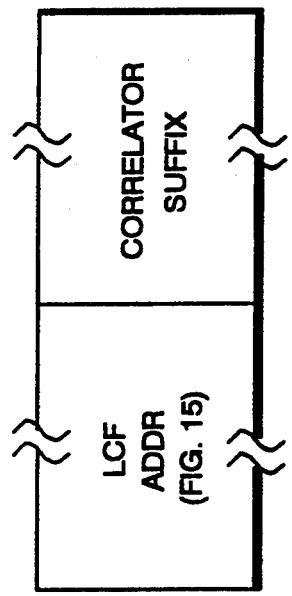
FIG. 18 illustrates the format of the Correlator field of an MPTN message of the present invention.

Referring now to FIG. 18, the correlator field as identified in FIG. 17 is shown. The correlator field consists of two individual fields: an LCF address field which represents the address of the MPTN local control function that initiated this procedure and a correlator suffix field which represents a unique identifier for this procedure.

Figure 19:
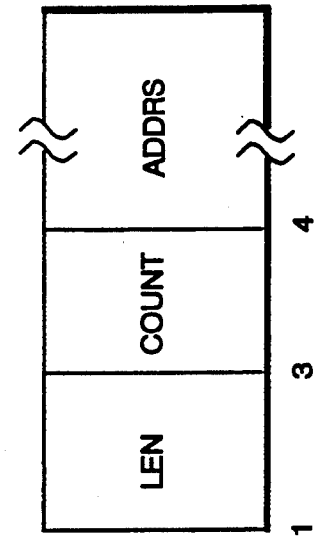
FIG. 19 illustrates the format of the Address List field of an MPTN message of the present invention.

FIG. 19 illustrates the address list field which format is used in the User address field and Provider address field of the EA-Register command of FIG. 17. The address list field of FIG. 19 consists of three fields: (1) a three byte length field representing the length of the list; (2) a single byte count field representing the number of addresses that follow; and (3) a variable length address field representing a number of addresses (indicated in the count field), either transport User address or transport Provider addresses.

FIGS. 10–19 have illustrated example formats for a number of commands, i.e., Connect, MPTN Datagram and Register, and these particular formats are not required for the present invention. The formats for the remaining commands are quite similar and, with the information provided, one of ordinary skill in the art may configure the remaining command formats in a similar manner.

While the invention has been particularly shown and described with reference to preferred embodiments thereof, it will be understood by those skilled in the art that various other changes in form and detail may be made without departing from the spirit and scope of the invention.

What is claimed is:

1. A method of establishing proper addressing in a first node so that transport-level communication may be established across a network between a source transport User in said first node and a destination transport User in a second node, said source transport User having a first address and a first addressing format and being supported by a plurality of source transport Providers in said first node at the interface to the network, said destination transport User having a second address and a second addressing format and being supported by a plurality of destination transport Providers in said second node at the interface to the network, each of said source and destination transport Providers having unique address from each other and from said transport Users and an addressing format different from said transport Users, said method comprising the steps of:

(a) in said first node, identifying a source transport User requesting to establish communication with a destination transport User;

(b) in said first node, identifying said requested destination transport User;

(c) in said first node, identifying one or more of said plurality of source transport Providers, in said first node, which support said source transport User;

(d) identifying one or more of said plurality of destination transport Providers, in said second node, which support said destination transport User; and (e) identifying a common transport protocol supported by a source transport Provider, in said first node, which supports said source transport User and further supported by a destination transport Provider, in said second node, which supports said destination transport User.

2. The method as defined in claim 1 further comprising, after step (e), step (f) of, where there are a plurality of common transport protocols, each transport protocol having a total compensation effort weight, said total compensation effort weight being a measure of the total effort required to provide compensation between said source transport User and said source transport Provider, selecting the transport protocol with the least total compensation effort weight.

3. A method of establishing transport-level communication between a source transport User in a first node and a destination transport User in a second node, said source transport User having a first addressing format and being supported by a plurality of source transport Providers in said first node at the interface to the network, one or more of said plurality of source transport Providers having a second addressing format, said destination transport User having a third addressing format and being supported by a plurality of destination transport Providers at said second node at the interface to the network, said method comprising the steps of:
 (a) in said first node, identifying a source transport User in said first node requesting to establish communication with a destination transport User in said second node;
 (b) in said first node, identifying said requested destination transport User in said second node;
 (c) determining whether said source transport User and said destination transport User have the same addressing formats;
 (d) if so, in said first node, determining whether a source transport Provider is available that uses said same addressing format: and
 (e) if so, using said source transport Provider for establishing a connection between said source transport User and said destination transport User.

4. The method of establishing communication defined in claim 3 wherein the method further comprises, after step (d), the step (d1) of, if not, determining whether a source transport Provider, in said first node, is available which has protocol-specific address mapping, the step (d2) of, if so, attempting to use said protocol-specific address mapping to obtain a destination transport Provider address, step (d3) of, if not successful, determining whether another source transport Provider, in said first node, is available which has protocol-specific address mapping, and step (d4) of, if so, repeating step (d2).

5. The method of establishing communication defined in claims 3 or 4 wherein step (b) further comprises determining whether said destination transport User is recognized, and further wherein the method further comprises the step (f) of completing the establishment of the communication if said destination transport User is recognized.

6. A method of registering a transport User, having a unique transport User address, for a plurality of transport Providers, each having a unique transport Provider address, with a network address resolution service unit so that a source transport User, at a first node, having a first addressing format and being supported by a plurality of source transport Providers in said first node, wishing to establish transport-level communication across a network with a destination transport User, at a second node, having said first addressing format and being supported by a plurality of destination transport Providers in said second node, may locate said destination transport User, at least one of said source transport Providers and at least one of said destination transport Providers having a second addressing format, said second addressing format being different from said first addressing format, said method comprising the steps of:
 (a) receiving a request from said transport User for registering said transport User for communication through said network:
 (b) determining the available transport Providers having said second addressing format for which said transport User has not yet been registered; and
 (c) sending a message to said network address resolution service unit for registering said transport User with said transport User address and said transport Provider address of an available, unregistered transport Provider having said second addressing format.

7. The method of registering a transport User as defined in claim 6 further comprising, after step (b), the step (b1) of determining whether a transport Provider which is native to said transport User is available and the step (b2) of, if so, using a protocol-specific mechanism for registering said transport User address.

8. The method of registering a transport User as defined in claim 6 or claim 7 further comprising the step (d) of repeating step (b) through step (c) until said transport User has been registered for all available transport Providers.

9. A system in a node for establishing proper addressing so that transport-level communication may be established across a network between a source transport User in said first node and a destination transport User in a second node, said source transport User having a first address and a first addressing format and being supported by a plurality of source transport Providers in said first node at the interface to the network, said destination transport User having a second address and a second addressing format and being supported by a plurality of destination transport Providers in a second node at the interface to the network, each of said source and destination transport Providers having unique address from each other and from said transport Users and an addressing format different from said transport Users, said system comprising:
 (a) means, in said first node, for identifying a source transport User requesting to establish communication with a destination transport User;
 (b) means, in said first node, for identifying said requested destination transport User;
 (c) means for identifying one or more of said plurality of source transport Providers, in said first node, which support said source transport User;
 (d) means for identifying one or more of said plurality of destination transport Providers, in said second node, which support said destination transport User; and
 (e) means for identifying a common transport protocol supported by a source transport Provider, in said first node, which supports said source transport User and further supported by a destination transport Provider, in said second node, which supports said destination transport User.

10. The system as defined in claim 9, where there are a plurality of common transport protocols, each transport protocol having a total compensation effort weight, said total compensation effort weight being a measure of the total effort required to provide compensation between said source transport User and said source transport Provider, said system further comprising means for selecting the transport protocol with the least total compensation effort weight.

11. The system as defined in claims 9 or 10 wherein said source transport User is located at a first access node and said destination transport User is located at a second access node and further wherein said common transport Provider identification means comprises an address registry.

12. The system as defined in claim 11 wherein said first access node is part of a first multi-protocol transport network (MPTN) and said second access node is part of a second MPTN, said MPTNs being connected by a gateway.

13. In a system for conveying transport-level communication between a source transport User in a first node and a destination transport User in another node, said source transport User having a first addressing format and being supported by a plurality of source transport Providers in said first node, at the interface to the network, one or more of said source transport Providers having a second addressing format, said destination transport User having a third addressing format and being supported by a plurality of destination transport Providers, in said another node, at another interface to the network, an apparatus for selecting one of said transport Providers for supporting the communication between said source transport User and said destination transport User, said apparatus comprising:
  (a) means, in said first node, for identifying a source transport User requesting to establish communication with a destination transport User;
  (b) means, in said first node, for identifying said requested destination transport User;
  (c) means for determining whether said source transport User and said destination transport User have the same addressing formats;
  (d) means for determining whether a source transport Provider, in said first node, is available that uses said same addressing format; and
  (e) means for selecting said source transport Provider for establishing a connection between said source transport User and said destination transport User.

14. The system defined in claim 13 wherein the system further comprises means for determining whether a source transport Provider is available which has protocol-specific address mapping, and means for selecting said protocol-specific address mapping for obtaining said destination transport User address.

15. The system defined in claims 13 or 14 wherein said destination transport User identification means further comprises means for determining whether said destination transport User is recognized, and further wherein the system further comprises means for completing the establishment of the communication if said destination transport User is recognized.

16. The system defined in claims 13 or 14 wherein said source transport User is located at a first access node and said destination transport User is located at a second access node and further wherein said common transport Provider identification means comprises an address registry.

17. A system for registering a transport User at a first node, said transport User having a unique transport User address, for a plurality of transport Providers at said first node, each having a unique transport Provider address, with a network address resolution service unit so that a source transport User having a first addressing format and being supported by said one or more transport Providers in said first node at an interface to the network, wishing to establish transport-level communication across a network with a destination transport User at a second node, said destination transport User having said first addressing format being supported by said one or more transport Providers in said second node at an interface to the network, and so that said source transport User may locate said destination transport User, at least one of said transport Providers in said first node having a second addressing format, said second addressing format being different from said first addressing format, said system comprising:
  (a) means, in said first node, for receiving a request from said transport User, in said first node, for registering said transport User for communication through said network:
  (b) means, in said first node, for determining the available transport Providers, in said first node, having said second addressing format for which said transport User, in said first, node, has not yet been registered; and
  (c) means, in said first node, for sending a message to said network address resolution service unit for registering said transport User, in said first node, with said transport User address and the transport Provider address of an available, unregistered transport Provider, in said first, node, having said second addressing format, 18. The system for registering a transport User as defined in claim 17 further comprising means for determining whether a transport Provider, in said first node, which is native to said transport User, in said first node, is available and means, in said first node, for using a protocol-specific mechanism for registering said transport User address.

* * * * *